US012769101B2

(12) United States Patent
Ebe et al.

(10) Patent No.: US 12,769,101 B2
(45) Date of Patent: Oct. 20, 2026

(54) ZOOM LENS AND IMAGE CAPTURING APPARATUS INCLUDING THE SAME

(71) Applicant: CANON KABUSHIKI KAISHA, Tokyo (JP)

(72) Inventors: Hiroki Ebe, Tochigi (JP); Shunji Iwamoto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 582 days.

(21) Appl. No.: 18/052,159

(22) Filed: Nov. 2, 2022

(65) Prior Publication Data

US 2023/0305277 A1 Sep. 28, 2023

(30) Foreign Application Priority Data

Nov. 5, 2021 (JP) ................................ 2021-181187

(51) Int. Cl.
*G02B 15/14* (2006.01)
*G02B 13/00* (2006.01)
*G02B 15/22* (2006.01)

(52) U.S. Cl.
CPC . *G02B 15/145527* (2019.08); *G02B 13/0045* (2013.01); *G02B 13/009* (2013.01); *G02B 15/144511* (2019.08); *G02B 15/145511* (2019.08); *G02B 15/145519* (2019.08); *G02B 15/1465* (2019.08); *G02B 15/22* (2013.01)

(58) Field of Classification Search
CPC .... G02B 15/145527; G02B 15/145511; G02B 15/144511; G02B 15/22; G02B 13/009; G02B 13/0045
USPC ........................................................ 359/676
See application file for complete search history.

(56) References Cited

U.S. PATENT DOCUMENTS 5,684,639 A * 11/1997 Ohtake .......... G02B 15/143507 359/689
9,958,656 B2 * 5/2018 Kawamura ........ G02B 15/1425
(Continued)

FOREIGN PATENT DOCUMENTS

JP 2014157168 A 8/2014
JP 2022126042 A 8/2022
(Continued)

OTHER PUBLICATIONS

Gross et al. "Handbook of Optical Systems vol. 3: Aberration Theory and Correction of Optical Systems" Weinheim Germany, WILEY-VCH Verlag Gmbh & Co. KGaA, pp. 377-379 (Year: 2007).*

*Primary Examiner* — Pinping Sun
*Assistant Examiner* — Andrew R Wright
(74) *Attorney, Agent, or Firm* — Canon U.S.A., Inc. IP Division

(57) ABSTRACT

A zoom lens includes a first lens unit having negative refractive power, a second lens unit having positive refractive power, and a rear lens group including one or more lens units. The zoom lens includes an aperture stop. The rear lens group includes a focus lens unit having negative refractive power that is moved to an image side in focusing from an infinite to a close distance and at least one lens unit arranged on the image side of the focus lens unit. The first lens unit includes three or more negative lenses. The focus lens unit includes a cemented lens or a single lens. The zoom lens satisfies a predetermined inequality.

23 Claims, 13 Drawing Sheets

(56) References Cited

U.S. PATENT DOCUMENTS

| | | | | |
|---|---|---|---|---|
| 2013/0162884 | A1* | 6/2013 | Tashiro | G02B 27/646 359/680 |
| 2014/0036137 | A1* | 2/2014 | Inoue | G02B 27/646 359/557 |
| 2015/0077594 | A1* | 3/2015 | Nakahara | G02B 15/145523 359/680 |
| 2016/0349505 | A1* | 12/2016 | Kawamura | G02B 5/005 |
| 2016/0349531 | A1* | 12/2016 | Kawamura | G02B 15/173 |
| 2017/0293124 | A1* | 10/2017 | Kawamura | G02B 15/173 |
| 2017/0336549 | A1* | 11/2017 | Lo | G02F 1/133308 |
| 2017/0336594 | A1* | 11/2017 | Takada | G02B 15/145121 |
| 2018/0003929 | A1* | 1/2018 | Aoki | G02B 15/145519 |
| 2018/0164556 | A1* | 6/2018 | Ohishi | G02B 15/20 |
| 2019/0094490 | A1* | 3/2019 | Gyoda | G02B 15/1425 |
| 2020/0264413 | A1* | 8/2020 | Yamanaka | G02B 15/173 |

FOREIGN PATENT DOCUMENTS

| | | | |
|---|---|---|---|
| JP | 2022126058 | A | 8/2022 |
| WO | 2016203819 | A1 | 12/2016 |

* cited by examiner

INFINITE OBJECT DISTANCE
CLOSEST OBJECT DISTANCE
d-LINE
g-LINE
M
S
Fno = 4.6
Fno = 5.66
ω = 53.5°
ω = 53.7°
ω = 36.5°
ω = 36.1°
-0.400 0.400
-20.000 20.000
-0.050 0.050
SPHERICAL ABERRATION
ASTIGMATISM
DISTORTION (%)
CHROMATIC ABERRATION

ZOOM LENS AND IMAGE CAPTURING APPARATUS INCLUDING THE SAME

BACKGROUND

Technical Field

The aspect of the embodiments relates to a zoom lens appropriate for image capturing apparatuses such as a digital video camera, a digital still camera, a broadcasting camera, and a silver-halide film camera.

Description of the Related Art

There is a demand for reduction in weight of a focus lens unit included in a wide-angle zoom lens to provide quick focusing with a compact optical system.

To reduce the weight of a focus lens unit, Japanese Patent Application Laid-Open No. 2014-157168 discusses a zoom lens with a single negative lens.

The zoom lens discussed in Japanese Patent Application Laid-Open No. 2014-157168 is configured to generate a large negative distortion to achieve its compact size. However, with the configuration of the focus lens unit included in the zoom lens discussed in Japanese Patent Application Laid-Open No. 2014-157168, considerable variations in astigmatism and field curvature are expected to appear in focusing.

SUMMARY

According to an aspect of the embodiments, a zoom lens including a first lens unit having negative refractive power, a second lens unit having positive refractive power, and a rear lens group including one lens unit or more lens units, all of which are sequentially arranged from an object side to an image side in the zoom lens, the first lens unit is moved for zooming, and an interval between each of adjacent lens units is changed for zooming, includes an aperture stop. The rear lens group includes a focus lens unit having negative refractive power that is moved to the image side in focusing from an infinite to a close distance and at least one lens unit arranged on an image side of the focus lens unit. The rear lens group includes a focus lens unit having negative refractive power that is moved to the image side in focusing from an infinite to a close distance and at least one lens unit arranged on an image side of the focus lens unit. The first lens unit includes three or more negative lenses. The focus lens unit includes a cemented lens or a single lens. Where a distance from the aperture stop to a surface vertex of the focus lens unit positioned closest to the object side at a wide-angle end is Lfw, a distance from the aperture stop to an image plane at the wide-angle end is Ls, a curvature radius of a lens surface of the focus lens unit positioned closest to the object side is Ra, and a curvature radius of a lens surface of the focus lens unit positioned closest to the image side is Rb, inequalities $$0.3<Lfw/Ls<0.5$$

$$0.8<(Rb+Ra)/(Rb-Ra)<2.2$$

are satisfied.

Further features of the disclosure will become apparent from the following description of exemplary embodiments with reference to the attached drawings.

DESCRIPTION OF THE EMBODIMENTS

Figure 1:
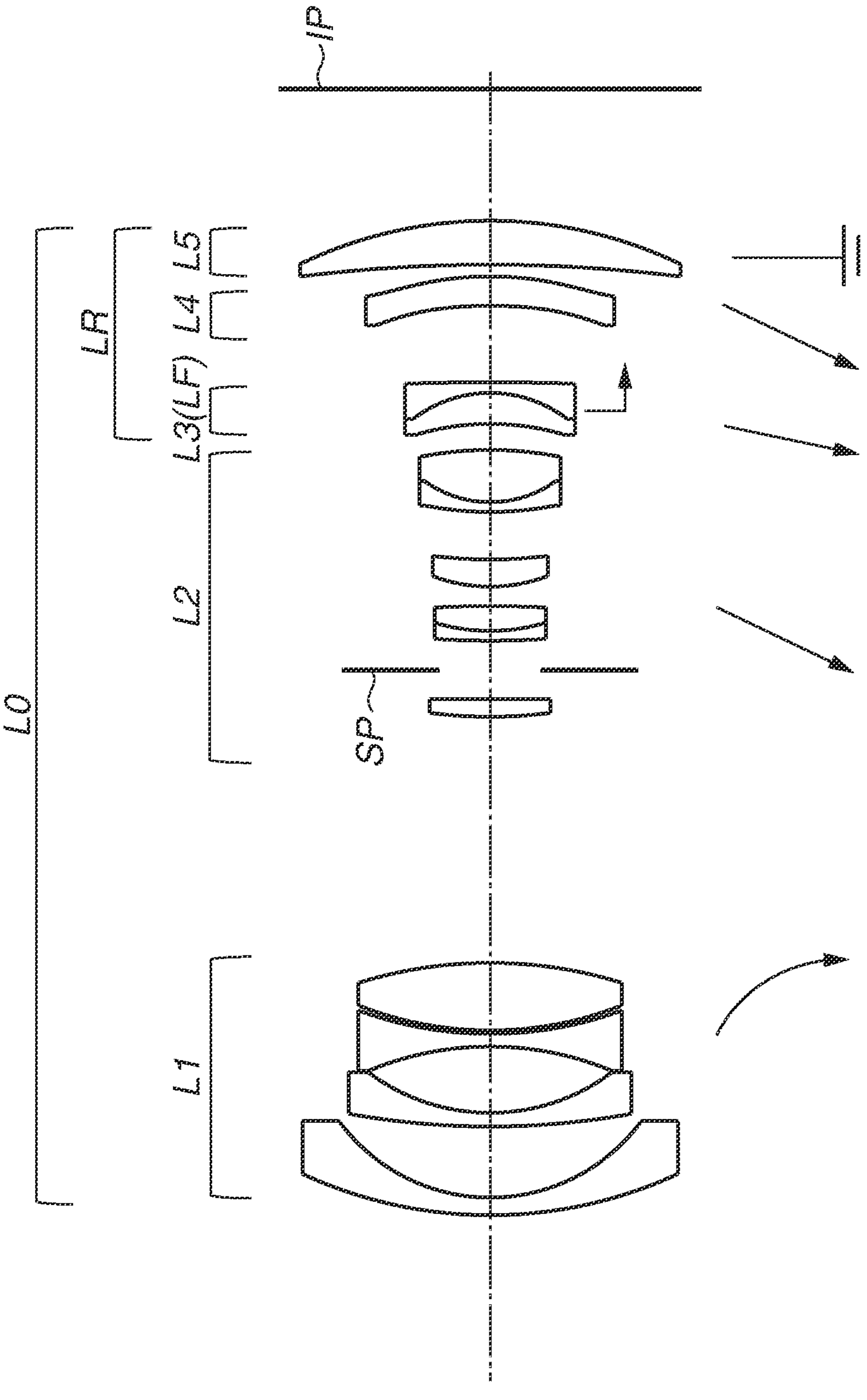
FIG. 1 is a cross-sectional diagram of a zoom lens according to an embodiment 1.
Figure 2A:
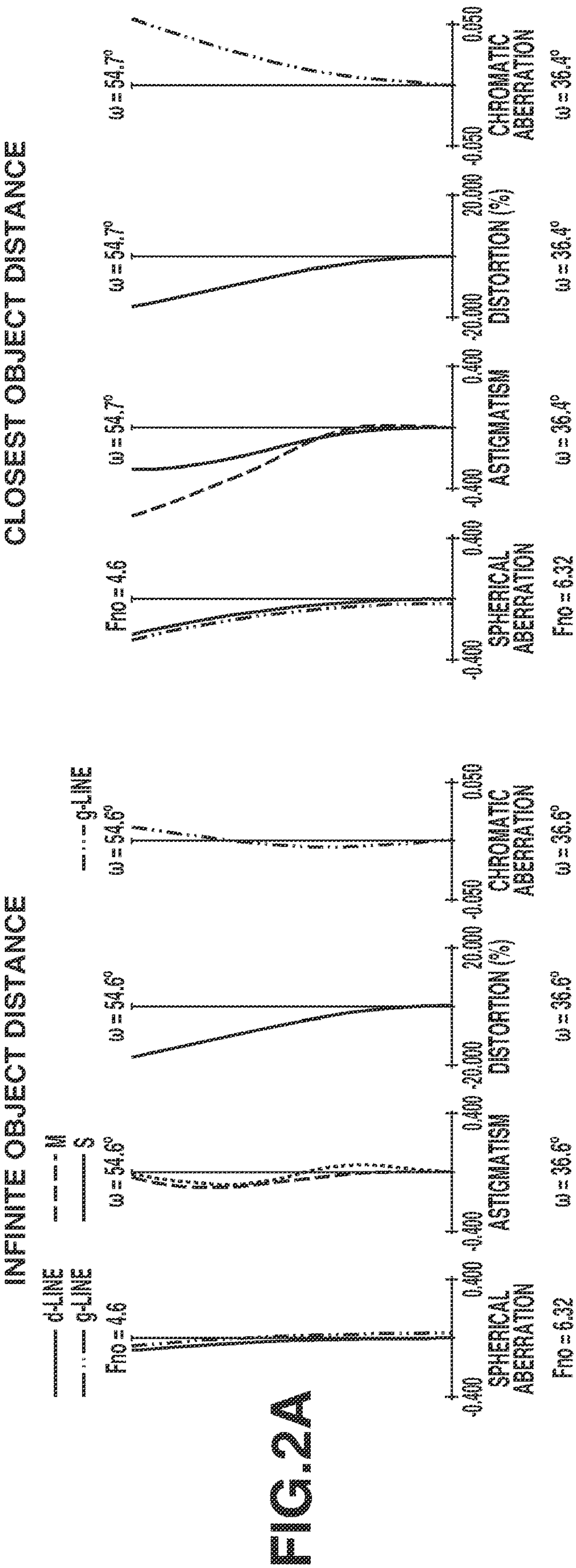
FIGS. 2A and 2B are aberration charts of the zoom lens according to the embodiment 1.
Figure 2B:
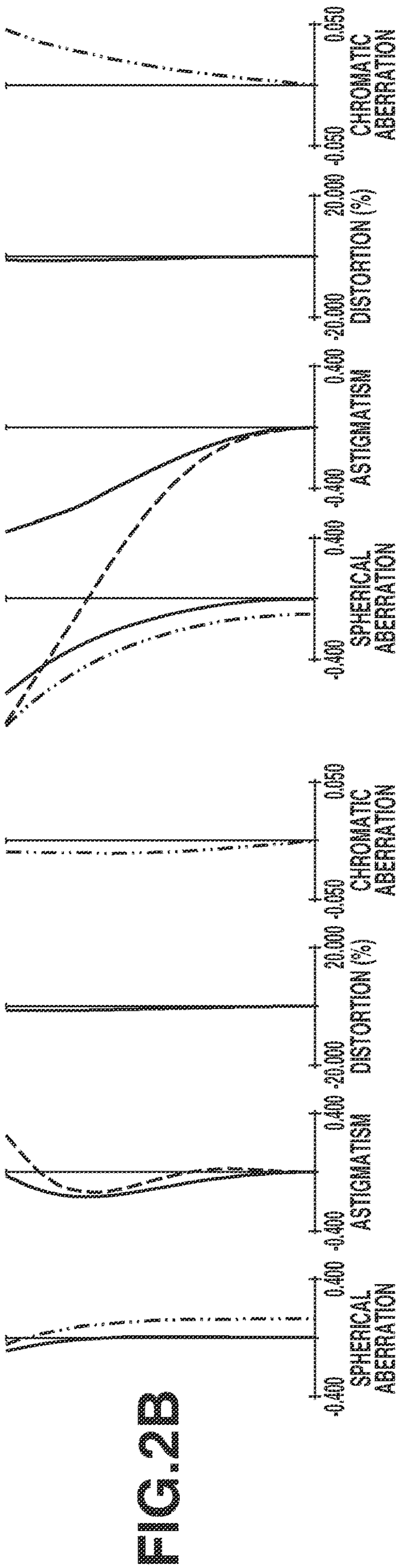
Figure 3:
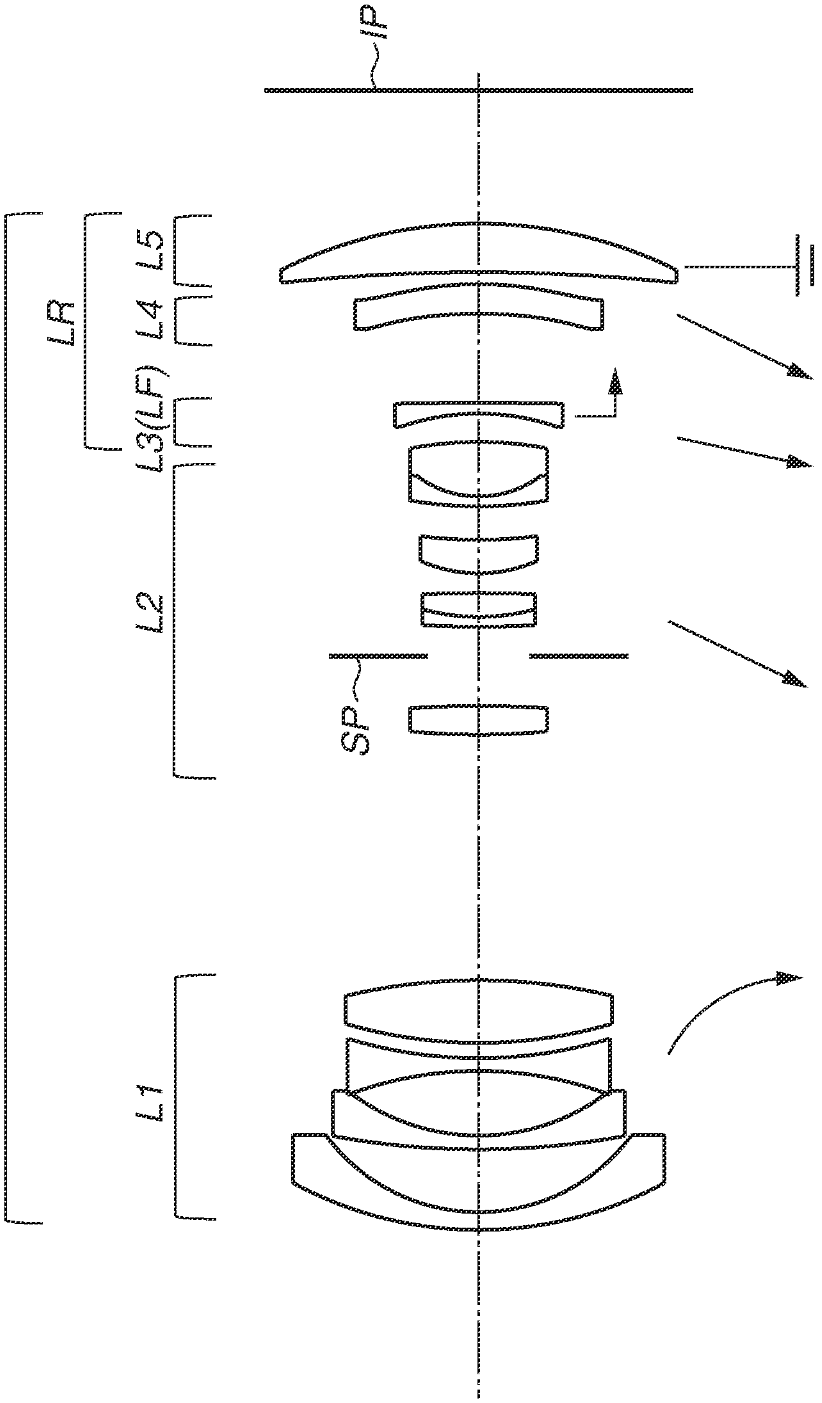
FIG. 3 is a cross-sectional diagram of a zoom lens according to an embodiment 2.
Figure 4A:
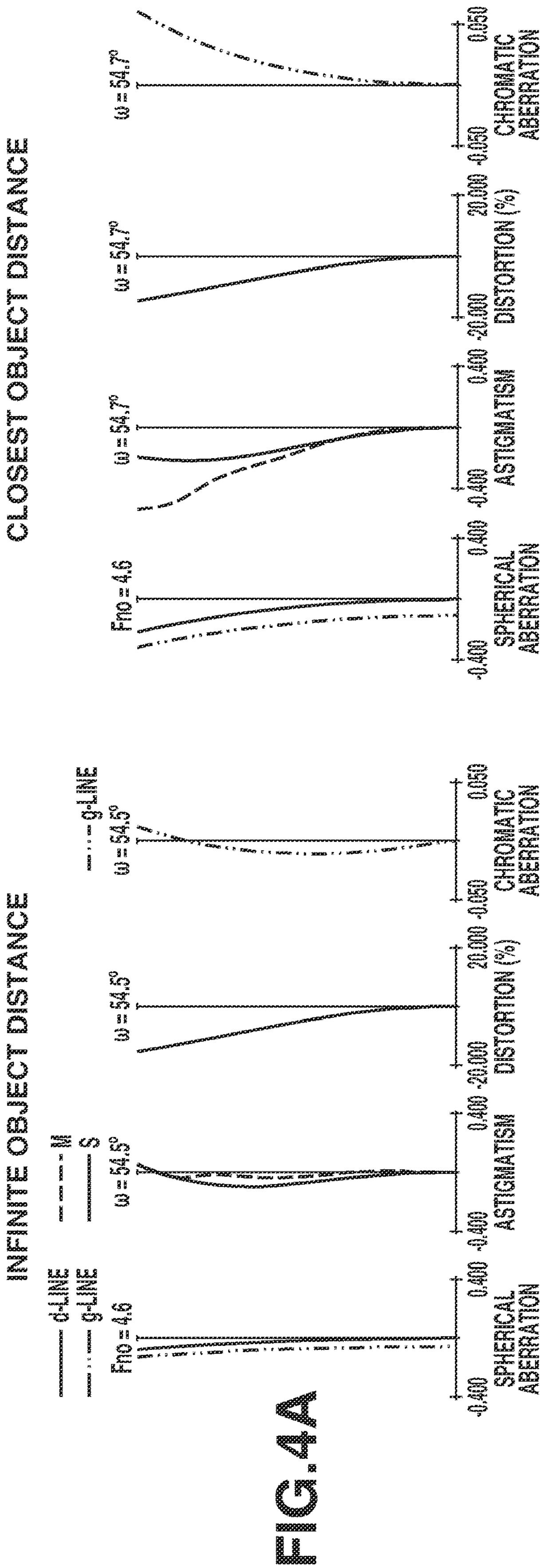
FIGS. 4A and 4B are aberration charts of the zoom lens according to the embodiment 2.
Figure 4B:
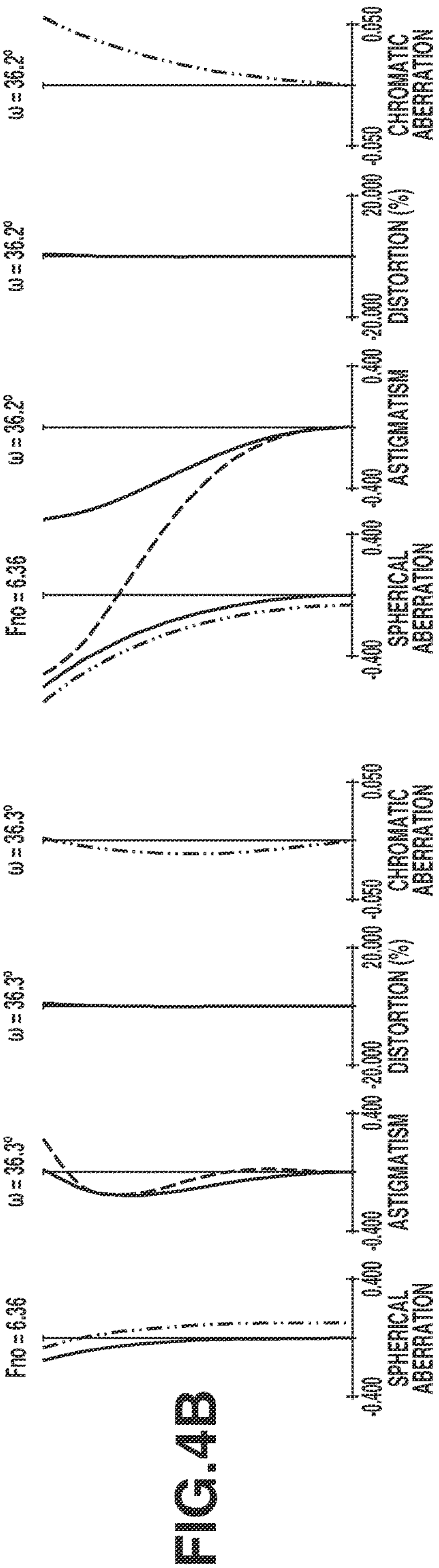
Figure 5:
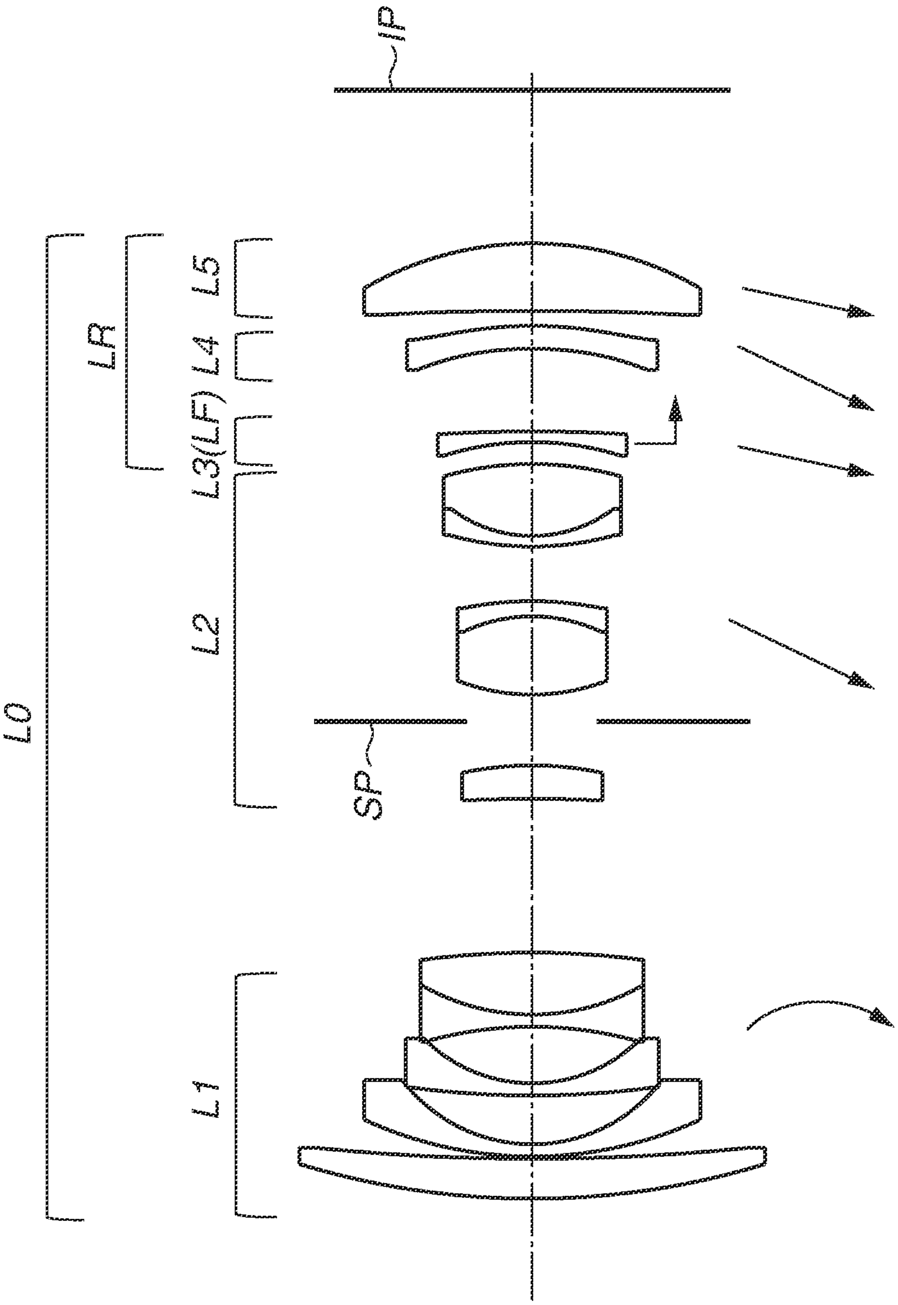
FIG. 5 is a cross-sectional diagram of a zoom lens according to an embodiment 3.
Figures 6A, 6B:
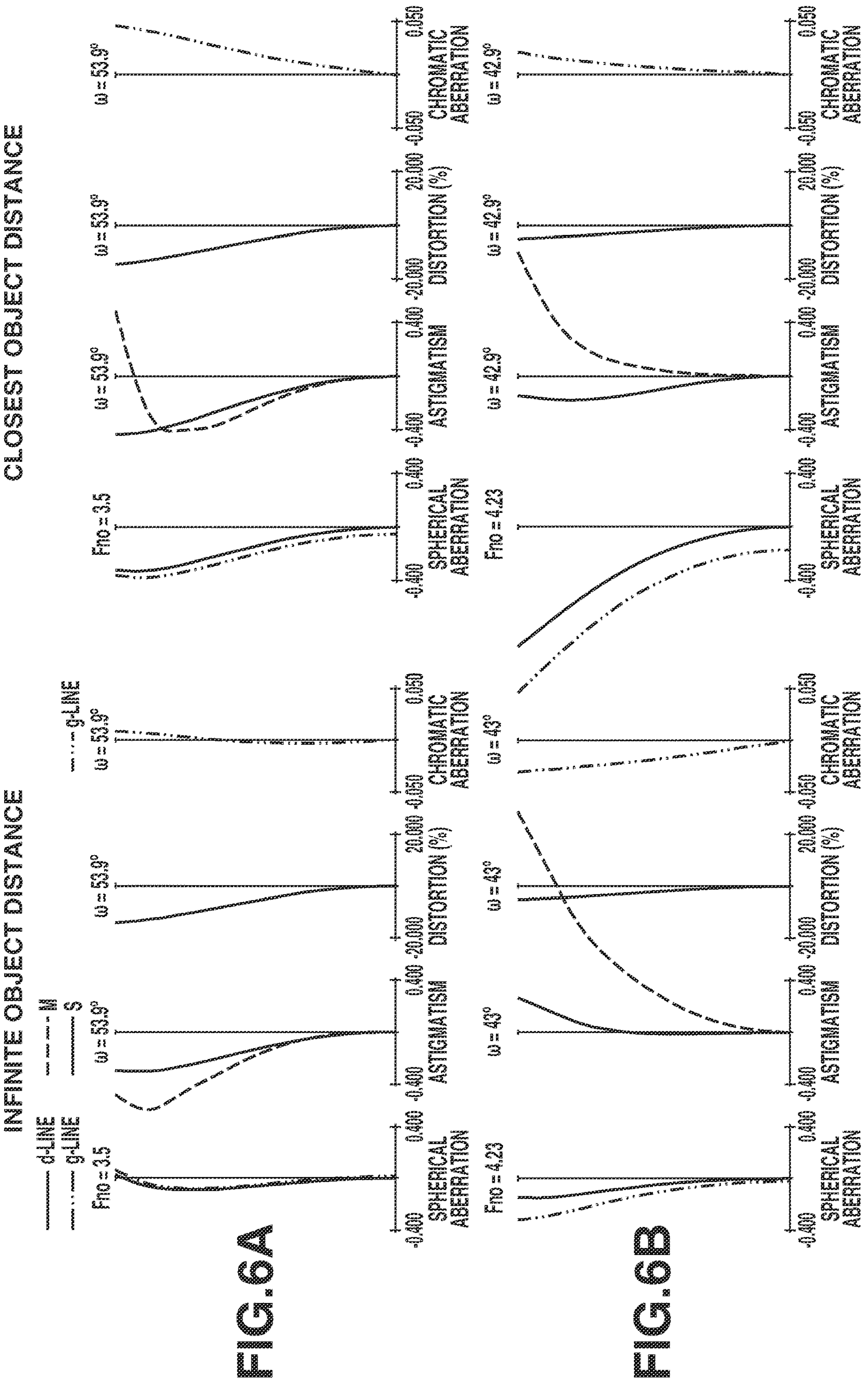
FIGS. 6A and 6B are aberration charts of the zoom lens according to the embodiment 3.
Figure 7:
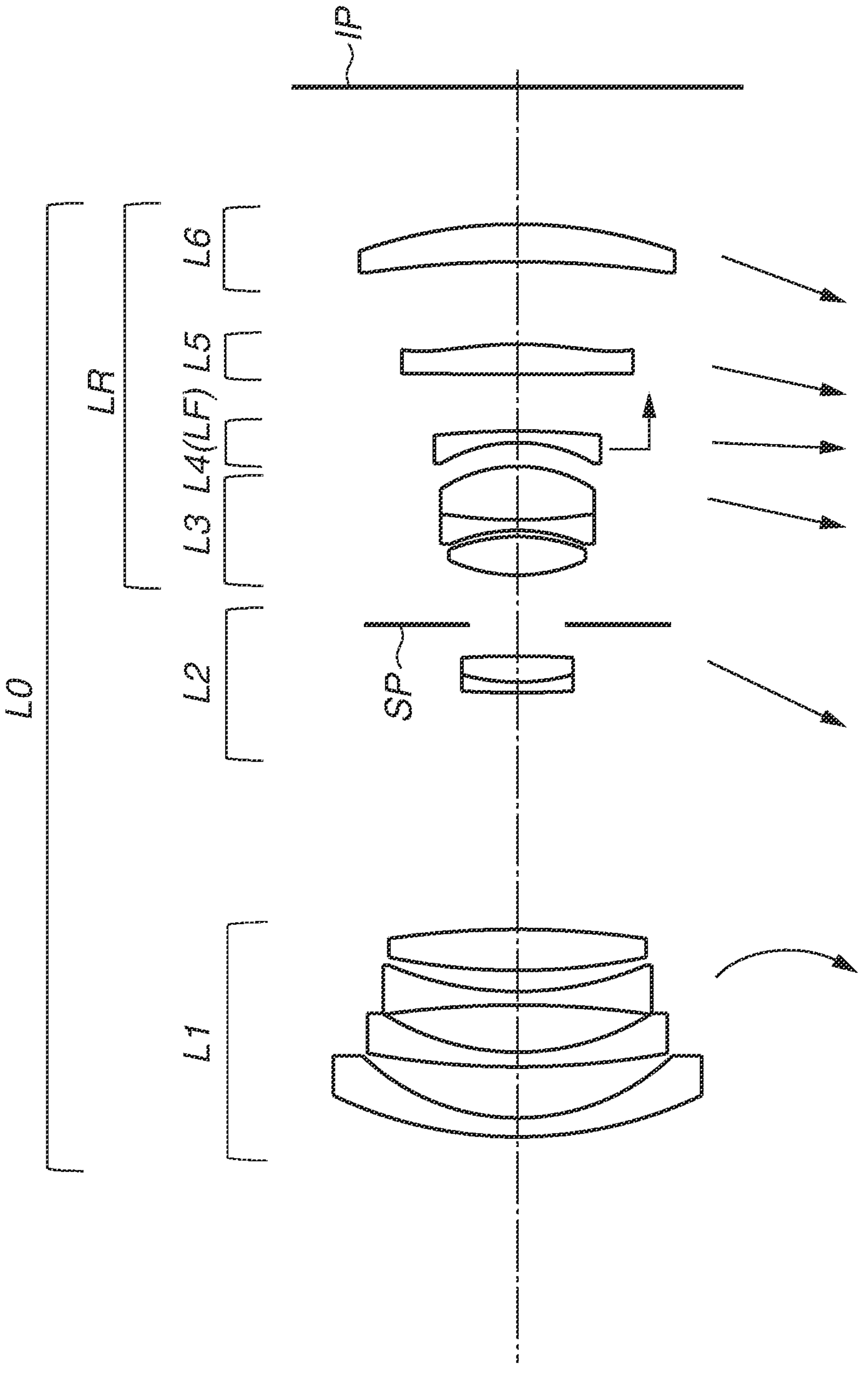
FIG. 7 is a cross-sectional diagram of a zoom lens according to an embodiment 4.
Figures 8A, 8B:
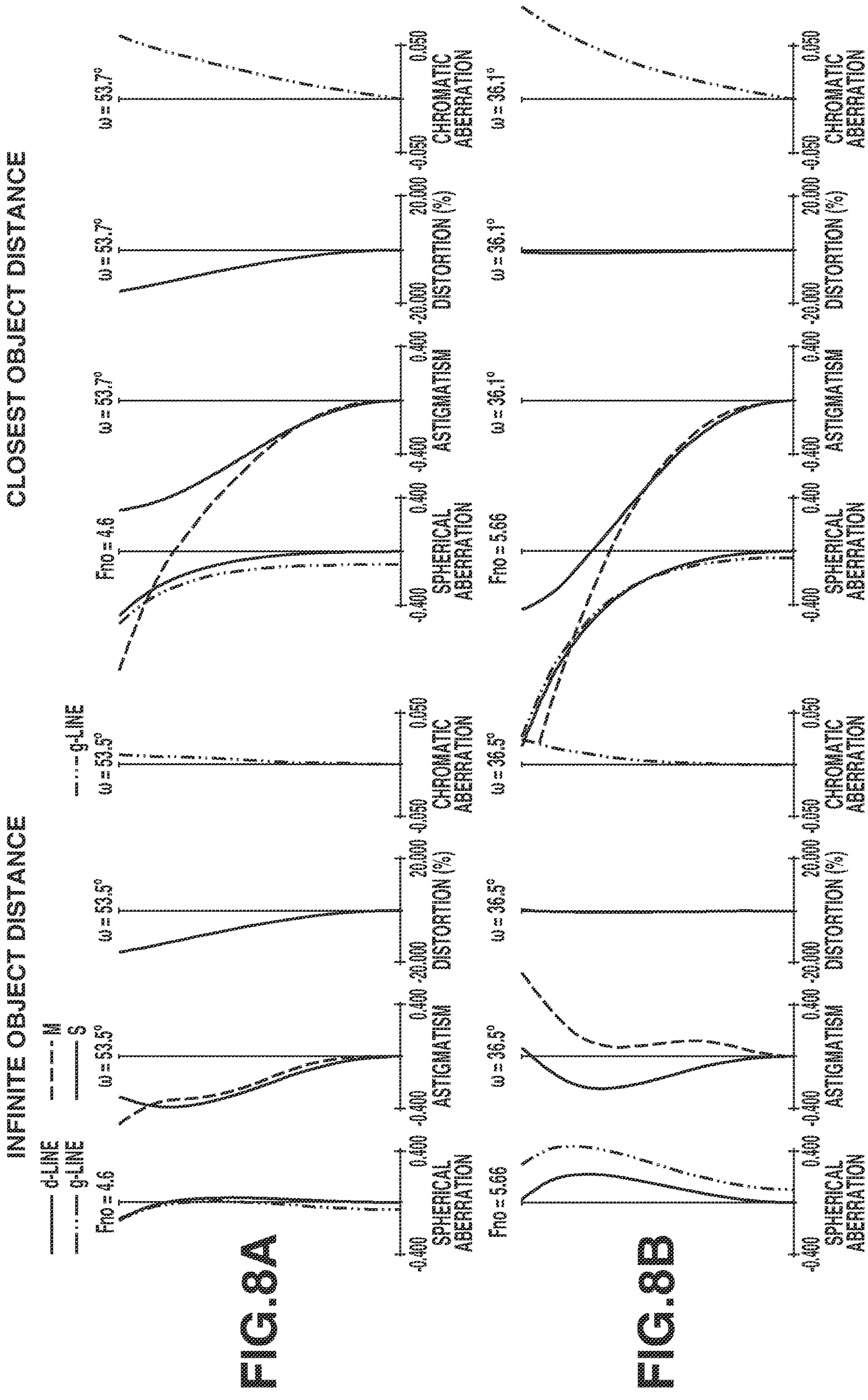
FIGS. 8A and 8B are aberration charts of the zoom lens according to the embodiment 4.
Figure 9:
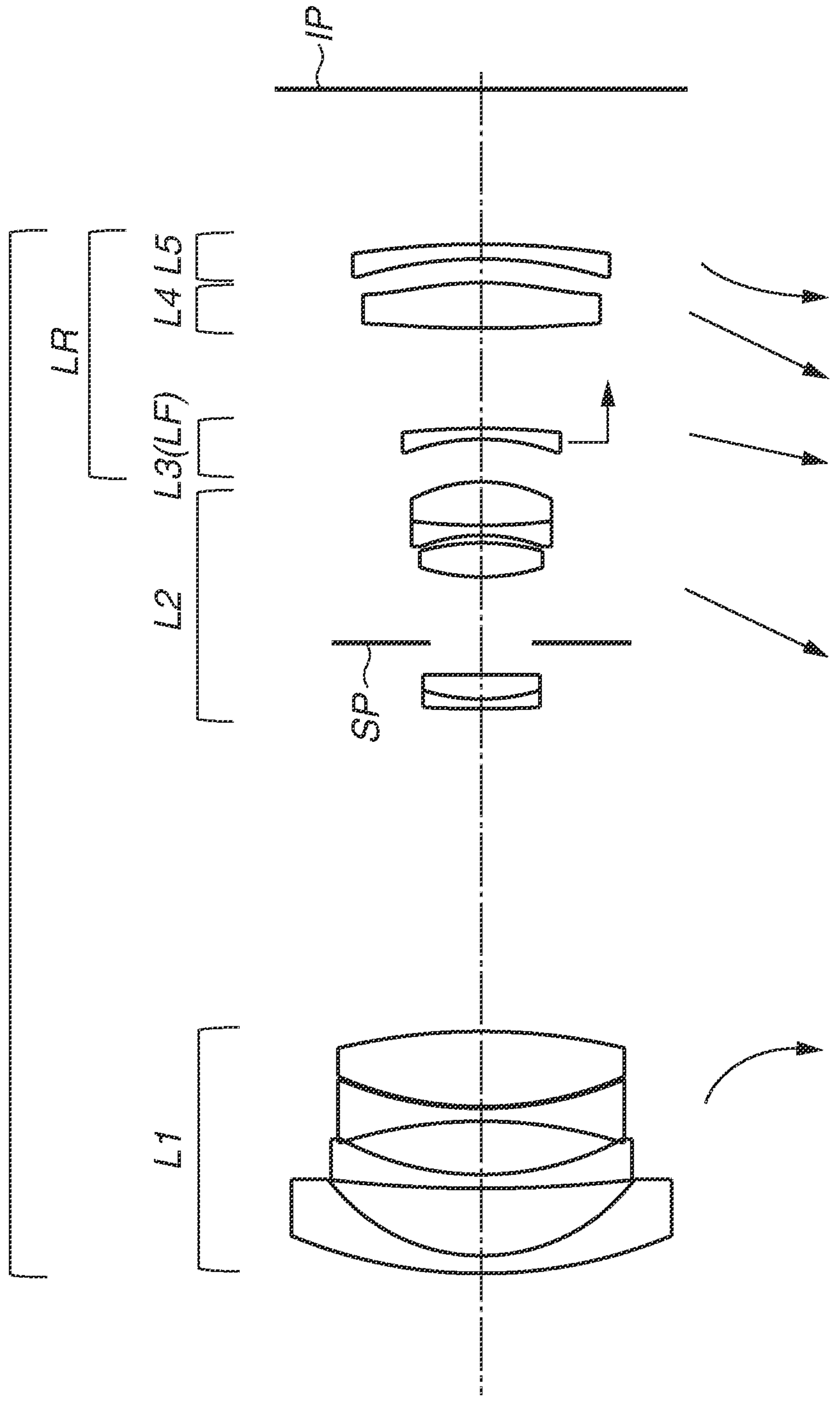
FIG. 9 is a cross-sectional diagram of a zoom lens according to an embodiment 5.
Figures 10A, 10B:
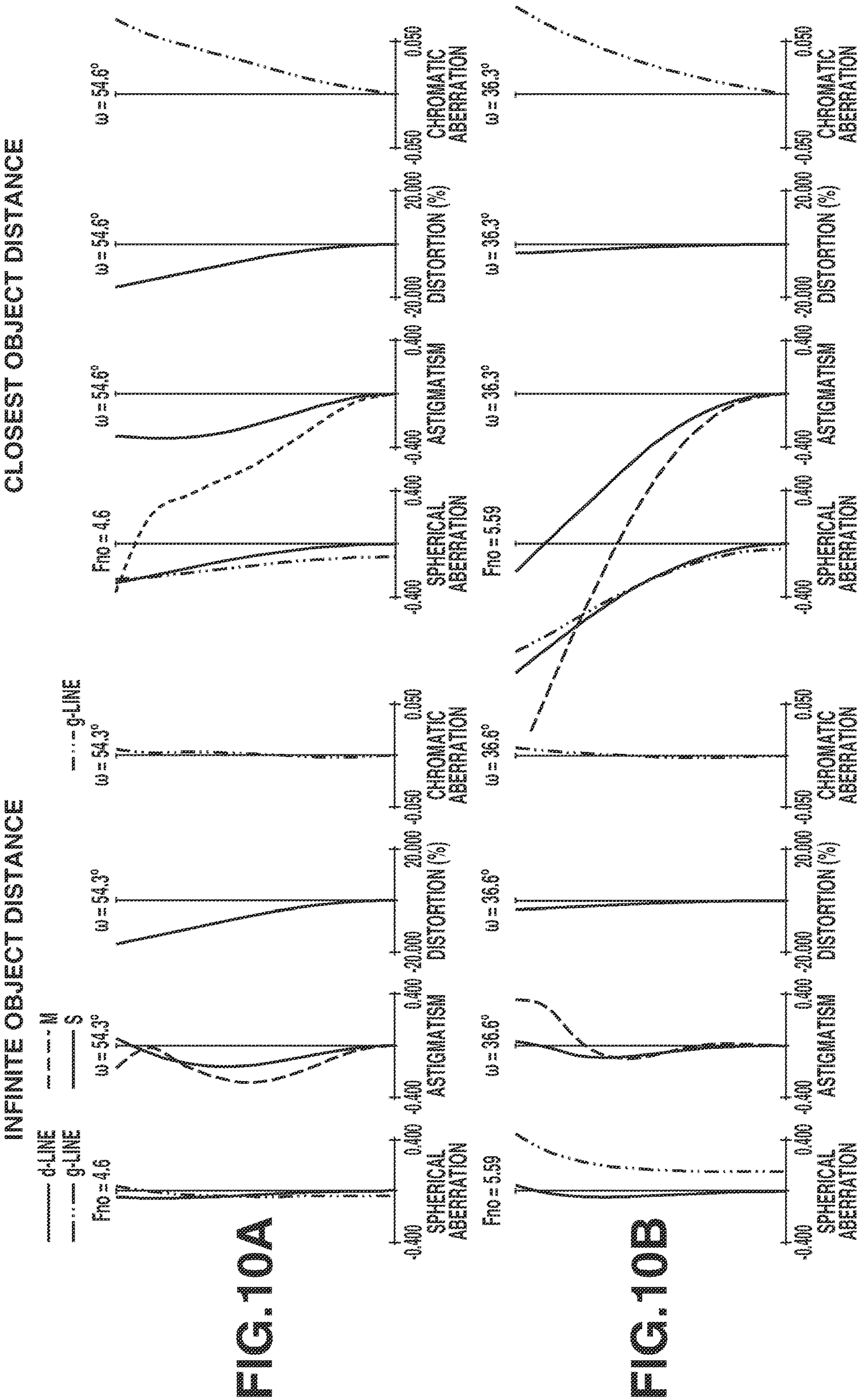
FIGS. 10A and 10B are aberration charts of the zoom lens according to the embodiment 5.
Figure 11:
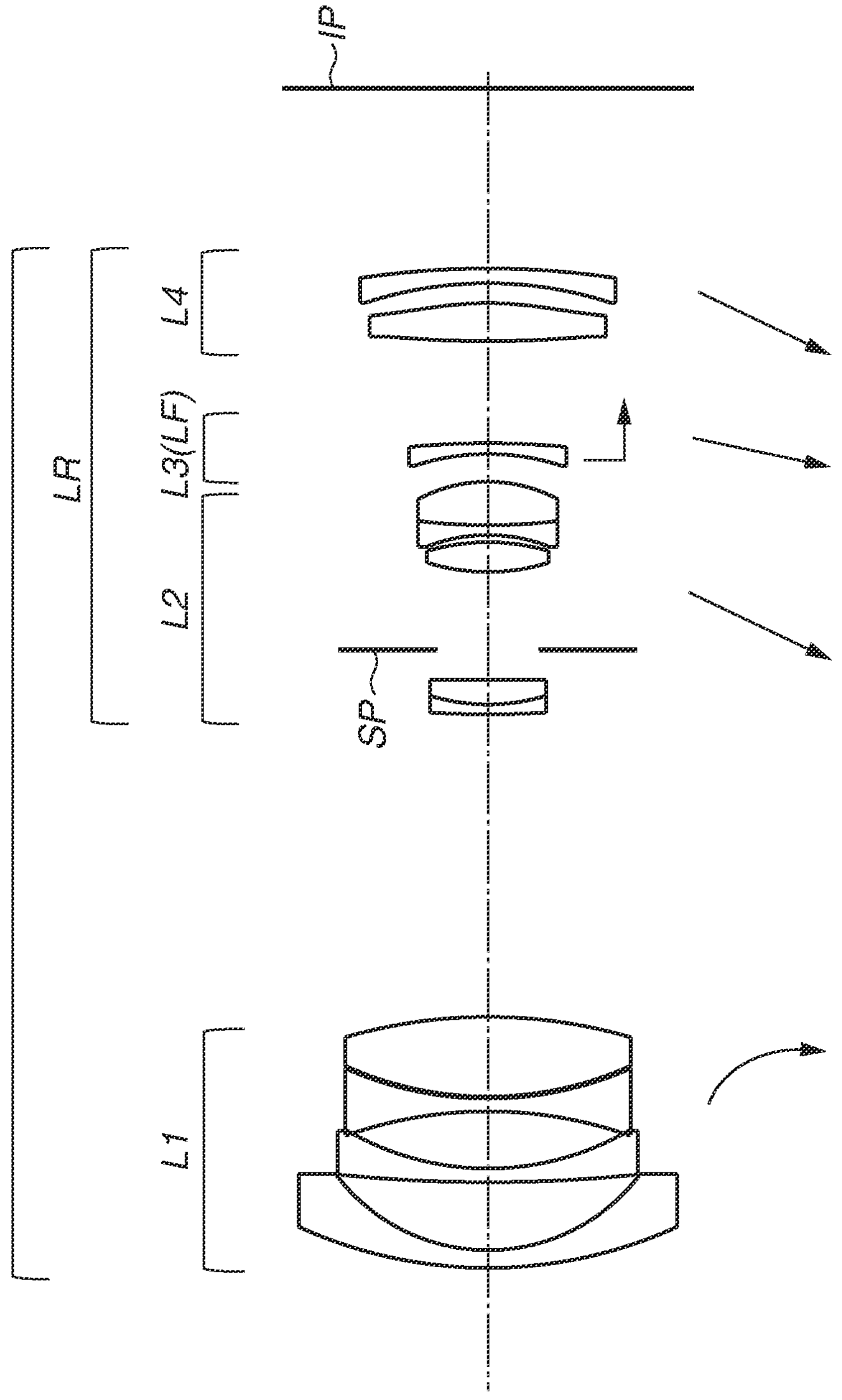
FIG. 11 is a cross-sectional diagram of a zoom lens according to an embodiment 6.
Figures 12A, 12B:
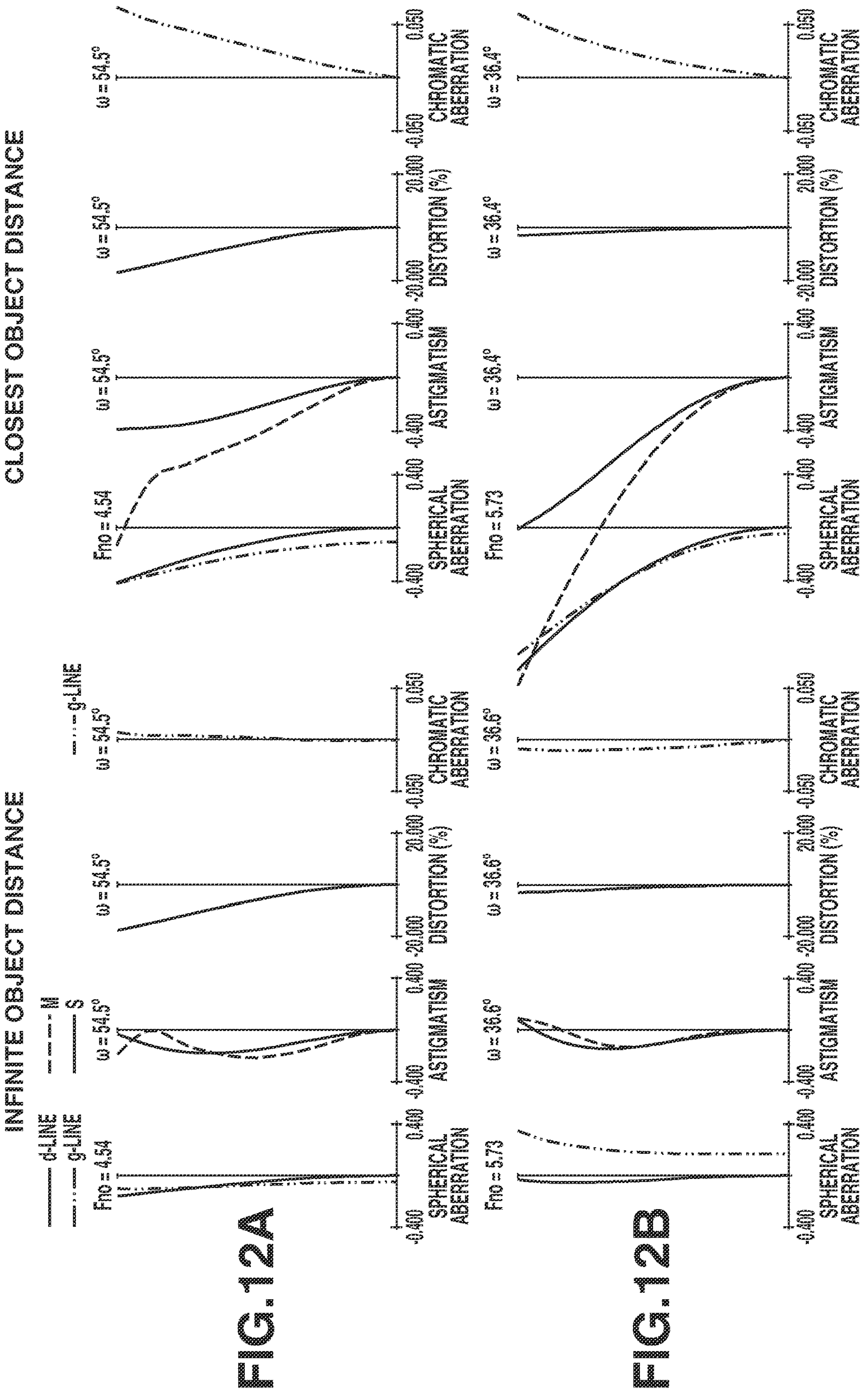
FIGS. 12A and 12B are aberration charts of the zoom lens according to the embodiment 6.

Hereinafter, a zoom lens according to various embodiments of the present disclosure and an exemplary embodiment of an image capturing apparatus including the zoom lens will be described with reference to the appended drawings.

FIGS. 1, 3, 5, 7, 9, and 11 are cross-sectional diagrams of zoom lenses L0 according to embodiments 1 to 6. The zoom lenses L0 according to the embodiments 1 to 6 are zoom lenses used for image capturing apparatuses such as a digital video camera, a digital still camera, a broadcasting camera, a silver-halide film camera, a monitoring camera, and a car-mounted camera.

The left side of each of the cross-sectional diagrams 1, 3, 5, 7, 9, and 11 corresponds to an object side, whereas the right side thereof corresponds to an image side. In addition, the zoom lenses L0 according to the embodiments 1 to 6 can be used as projection lenses used for projectors. In this case, the left side of each of the cross-sectional diagrams 1, 3, 5, 7, 9, and 11 corresponds to a screen side, whereas the right side thereof corresponds to a projection image side.

Each of the zoom lenses L0 according to the embodiments 1 to 6 includes a first lens unit L1 having negative refractive power, a second lens unit L2 having positive refractive power, and a rear lens group LR including one or more lens units, which are arranged in that order from the object side to the image side. Further, the rear lens group LR includes a focus lens unit LF which is moved in focusing and at least one lens unit arranged on the image side of the focus lens unit LF.

In each of the cross-sectional diagrams 1, 3, 5, 7, 9 and 11, a symbol Li (i is a natural number) represents the i-th lens unit from the object side. In this specification documents, lens unit refers to a unit of lenses integrally moved or immobilized in zooming. In other words, the interval between each of the adjacent lens units is changed in zooming. Further, each of the lens units may consist of a single lens or a plurality of lenses. Furthermore, each of the lens units may include an aperture stop.

Further, arrows illustrated in each of the lens cross-sectional diagrams 1, 3, 5, 7, 9, and 11 express moving loci from an wide-angle end to a telephoto end in zooming and moving loci from an infinite to a close distance in focusing.

In each of the lens cross-sectional diagrams 1, 3, 5, 7, 9, and 11, a symbol SP represents an aperture stop. A symbol IP represents an image plane, and the imaging plane of a solid-state image sensor (photoelectric conversion element) such as a charge coupled device (CCD) sensor or a complementary metal-oxide semiconductor (CMOS) sensor is positioned at the image plane IP in a digital still camera or a digital video camera with any of the zoom lenses L0 according to the embodiments 1 to 6. With any of the zoom lenses L0 according to the embodiments 1 to 6 used as an image-capturing zoom lens in a silver-halide film camera, the photosensitive surface corresponding to the film surface is positioned at the image plane IP.

FIGS. 2A and 2B, 4A and 4B, 6A and 6B, 8A and 8B, 10A and 10B, and 12A and 12B each illustrate aberration charts of the corresponding zoom lens L0 according to each of the embodiments 1 to 6. The aberration charts (A) are aberration charts of the wide-angle end, and the aberration charts (B) are aberration charts of the telephoto end. Both the aberration charts (A) and (B) illustrate aberrations at an infinite object distance and a closest object distance.

In a spherical aberration chart, Fno represents an F-number, and amounts of spherical aberration are illustrated with respect to a d-line (wavelength of 587.6 nm) and a g-line (wavelength of 435.8 nm). In an astigmatism chart, the amount of astigmatism in a sagittal image plane S and the amount of astigmatism in a meridional image plane M are illustrated. In a distortion chart, the amount of distortion is illustrated with respect to the d-line. In a chromatic aberration chart, the amount of magnification chromatic aberration is illustrated with respect to the g-line. A symbol ω represents an imaging half-angle of view (°).

Next, characteristic configurations of the zoom lenses L0 according to the embodiments 1 to 6 will be described.

In each of the zoom lenses L0 according to the embodiments 1 to 6, with a lens unit having negative refractive power disposed as the first lens unit L1, the position of the entrance pupil is shifted toward the object, and the diameter of the front lens (i.e., a lens arranged closest to the object side) is reduced.

Further, with a lens unit having positive refractive power disposed as the second lens unit L2, divergent axial marginal rays through the first lens unit L1 are converged, and the diameters of the second lens unit L2 and the lens units following after the second lens unit L2 are reduced. Furthermore, the focus lens unit LF, which will be moved in focusing, is arranged at a position farthest from the image side of the rear lens group LR, so that the height of an off-axis ray incident on the focus lens unit LF can relatively be lowered. With this configuration, the diameter of the focus lens unit LF is reduced.

Further, with three or more negative lenses included in the first lens unit L1, field curvature and astigmatism particularly occurring at the wide-angle end are reduced effectively.

Furthermore, with the focus lens unit LF consisting of a cemented lens or a single lens, the weight of the focus lens unit LF is reduced.

Further, the focus lens unit LF satisfies the following inequalities. Herein, Lfw is a distance between the aperture stop SP and the surface vertex of the lens surface of the focus lens unit LF positioned closest to the object side at the wide-angle end. Ls is a distance between the aperture stop SP and the image plane IP at the wide-angle end. Ra is a curvature radius of the lens surface of the focus lens unit LF positioned closest to the object side. Rb is the radius of curvature of the lens surface of the focus lens unit LF positioned closest to the image side.

$$0.3 < Lfw/Ls < 0.5 \quad (1)$$

$$0.8 < (Rb+Ra)/(Rb-Ra) < 2.2 \quad (2)$$

A condition (1) relates to the arrangement of the focus lens unit LF at the wide-angle end. If a value thereof is greater than the upper limit value, the focus lens unit LF is far away from the aperture stop SP. In this case, the height of an off-axis ray incident on the focus lens unit LF cannot sufficiently be lowered, so that the diameter of the focus lens unit LF is likely to be increased. Further, if a value thereof is less than the lower limit value, the focus lens unit LF is arranged at a position where the height of an axial marginal ray is high. This is not appropriate because the variation in spherical aberration is likely to be large in focusing.

Further, an inequality (2) relates to a shape factor of the focus lens unit LF. Variation in astigmatism and field curvature occurring in focusing can be reduced with the focus lens unit LF in a shape concentric with the aperture stop SP.

Variation ΔIII in astigmatism coefficient occurring when an object moves is expressed by the following formula.

$$\Delta III = -\delta(V + IIs) + \delta^2 Is$$

Herein, δ is a parameter of movement of the object, V is a distortion coefficient, IIs is a comatic aberration coefficient of the pupil, and Is is a spherical aberration coefficient of the pupil.

Herein, if a large negative distortion is generated for the purpose of miniaturization of the zoom lens L0, the distortion coefficient V becomes large. As a result, the variation ΔIII in astigmatism coefficient occurring when an object moves becomes large. Herein, if its surface of the focus lens unit LF on the image side is formed in a concave shape having a large curvature, an off-axis ray is obliquely incident on the surface of the focus lens unit on the image side, so that the variation in astigmatism and field curvature becomes large when the focus lens unit LF is moved. In other words, the focus lens unit LF is simultaneously affected by a large negative distortion and the shape of the focus lens unit LF. As a result, the variation in astigmatism becomes prominent in focusing.

In order to reduce the variation in astigmatism and field curvature occurring in focusing, the focus lens unit LF is formed into a shape concentric with the aperture, which satisfies the inequality (2). With this configuration, an off-axis ray is moderately (approximately perpendicularly) incident on the surface of the focus lens unit LF, so that the variation in image-forming performance can be reduced in focusing. If a value thereof is greater than the upper limit value, the lens surface of the focus lens unit LF positioned closest to the image side is formed into a concave shape having an excessively large curvature on the object side, so that a marginal ray of the on-axis light flux is obliquely incident thereon. This is not appropriate because the variation in spherical aberration becomes large. If a value thereof is less than the lower limit value, the lens surface of the focus lens unit LF positioned closest to the image side is formed into a concave shape having an excessively large curvature on the image side. This is not appropriate because the variation in astigmatism and field curvature becomes large.

The above-described configuration provides the zoom lens L0 including the lightweight focus lens unit LF, the zoom lens L0 exhibiting small variations in optical performance in focusing.

In addition, it is suitable that at least either the upper limit value or the lower limit value of the numerical range of the inequality (1) falls within the corresponding range described in the following inequality (1a), and at least either the upper limit value or the lower limit value of the numerical range of the inequality (2) falls within the corresponding range described in the following inequality (2a).

$$0.32 < Lfw/Ls < 0.47 \quad (1a)$$

$$0.9 < (Rb + Ra)/(Rb - Ra) < 2.0 \quad (2a)$$

Further, it is more suitable that at least either the upper limit value or the lower limit value of the numerical range of the inequalities (1) and (2) falls within the corresponding range described in the following inequality (1b), and at least either the upper limit value or the lower limit value of the numerical range of the inequality (2) falls within the corresponding range described in the following inequality (2b).

$$0.33 < Lfw/Ls < 0.45 \quad (1b)$$

$$1.0 < (Rb + Ra)/(Rb - Ra) < 1.9 \quad (2b)$$

Next, favorable configurations of the zoom lenses L0 according to the embodiments 1 to 6 will be described.

Although the focus lens unit LF may consist of a cemented lens, it is more suitable that the focus lens unit LF consist of a single lens. This allows the focus lens unit LF to be lighter.

Further, it is suitable that the focus lens unit LF is moved toward the object in zooming from the wide-angle end to the telephoto end. This allows the focus lens unit LF to be arranged at a position where the height of an off-axis ray is lower at the telephoto end, making the diameter of the focus lens unit LF easily smaller.

Further, it is suitable that a lens unit having positive refractive power is arranged in the rear lens group LR at a position closest to the image side. This makes the focus (position) sensitivity of the focus lens unit LF higher. Thus, this allows the amount of movement of the focus lens unit LF to be smaller in focusing from the infinite to the closest distance, resulting in a smaller diameter of the focus lens unit LF.

Further, it is suitable that the zoom lens L0 consists of a first lens unit L1 having negative refractive power, a second lens unit L2 having positive refractive power, a focus lens unit LF, a fourth lens unit L4 having positive refractive power, and a fifth lens unit L5 having positive refractive power. This configuration provides an appropriate back focal distance due to the positive refractive power of the fourth lens unit L4 and the fifth lens unit L5.

Furthermore, the zoom lens L0 may consist of a first lens unit L1 having negative refractive power, a second lens unit L2 having positive refractive power, a focus lens unit LF, a fourth lens unit L4 having negative refractive power, and a fifth lens unit L5 having positive refractive power. This configuration allows magnification chromatic aberration to be offset by the fourth lens unit L4 and the fifth lens unit L5, providing a higher performance.

Further, as the focus lens unit LF, the fourth lens unit L4, and the fifth lens unit L5 each consists of a single lens, the weight of the zoom lens L0 can be further reduced.

In this case, it is suitable that the lens surfaces of the focus lens unit LF, the fourth lens unit L4, and the fifth lens unit L5 on the image side are formed in convex shapes. This allows an off-axis ray moderately (approximately perpendicularly) to enter the surfaces thereof, reducing the variation in astigmatism and field curvature in focusing.

Further, it is suitable that the refractive index of the negative lens included in the focus lens unit LF is 1.75 or more. This provides a gentle curvature of the focus lens unit LF, resulting in a smaller volume of the focus lens unit LF. Thus, this configuration allows the weight of the focus lens unit LF to be reduced.

Next, inequalities which the zoom lenses L0 of the embodiments 1 to 6 should satisfy will be described.

It is suitable that the zoom lenses L0 of the embodiments 1 to 6 satisfy one or more of the following inequalities.

$$-3.5 < (1 - \beta f^2) \times \beta r^2 < -1.3 \quad (3)$$

$$0.6 < skw/fw < 1.4 \quad (4)$$

$$28 < vdn < 45 \quad (5)$$

$$0.020 < Dt/ft < 0.12 \quad (6)$$

$$-20 < 100 \times (y - y0)/y0 < -8 \quad (7)$$

$$-3.5 < fna/fw < -1.0 \quad (8)$$

$$1.4 < fs/fw < 3.0 \quad (9)$$

$$0.8 < Lft/Lfw < 1.4 \quad (10)$$

$$1.2 < ft/fw < 2.1 \quad (11)$$

Herein, βf is a lateral magnification of the focus lens unit LF at the telephoto end. βr is a combined lateral magnification of all of lens units arranged from the focus lens unit LF on the image side at the telephoto end. skw is a back focal distance at the wide-angle end. fw is a focal distance of the entire system of the zoom lens L0 at the wide-angle end. vdn is an Abbe number of a negative lens included in the focus lens unit LF. Dt is the amount of movement of the focus lens unit LF in focusing from the infinite to the closest distance at the telephoto end. Herein, Dt takes a positive value when the focus lens unit LF is moved to the image side from the object side. ft is a focal distance of the entire system of the zoom lens L0 at the telephoto end. y is a maximum real image height at the wide-angle end. y0 is an ideal image height at the angle of view (maximum angle of view) corresponding to the maximum real image height y at the wide-angle end. fna is a focal distance of the focus lens unit LF. fs is a combined focal distance of all of the lenses from the aperture stop SP to the focus lens unit LF at the wide-angle end. Lft is a distance from the aperture stop SP to the surface vertex of the lens surface of the focus lens unit LF positioned closest to the object side.

An inequality (3) represents a focus (position) sensitivity of the focus lens unit LF at the telephoto end. If a value thereof is less than the lower limit value, the absolute value of the ratio of the entrance angle of an axial ray incident on the focus lens unit LF to the exit angle of the axial ray toward the lens unit arranged on the image side of the focus lens unit LF becomes too great, causing a too large variation in spherical aberration when the focus lens unit LF is moved in focusing. If a value thereof is greater than the upper limit value, the focus (position) sensitivity becomes too low, so that the amount of movement from the infinite to the closest distance becomes large, with which the focus lens unit LF can be arranged at a position where the height of an off-axis ray is high, resulting in a larger size of the focus lens unit LF.

An inequality (4) represents the ratio of a back focal distance at the wide-angle end to the focal distance of the entire system at the wide-angle end. If a value thereof is less than the lower limit value, the back focal distance at the wide-angle end becomes too short. As a result, a ghost is likely to occur because of light reflected between a low-pass filter or an infrared ray (IR) cut filter arranged on the object side of the image plane IP and a lens included in the zoom lens L0 positioned closest to the image side. A value greater than the upper limit value is not appropriate because that will cause a larger size of the zoom lens L0.

An inequality (5) represents an Abbe number of a negative lens included in the focus lens unit LF. A value greater than the upper limit value is not appropriate because that makes it difficult to offset the magnification chromatic aberration occurring in the rear lens group LR by the negative lens of the focus lens unit LF sufficiently in focus at the infinity. If a value is less than the lower limit value, the magnification chromatic aberration is likely to be large particularly at the closest side. In addition, at least one negative lens may satisfy the inequality (5) when a plurality of negative lenses is included in the focus lens unit LF, although it is more suitable that all of the negative lenses satisfy the inequality (5).

An inequality (6) represents the ratio of the amount of movement of the focus lens unit LF in focusing from the infinite to the closest distance at the telephoto end to the focal distance of the entire system at the telephoto end. If a value thereof is less than the lower limit value, that entails strengthening the refractive power of the focus lens unit LF to allow focus on a sufficiently close distance, which is likely to result in larger variations in spherical aberration, field curvature, and astigmatism in focusing. If a value thereof is greater than the upper limit value, the amount of movement of the focus lens unit LF becomes too large, with which the focus lens unit LF can be arranged at a position where the height of an off-axis ray is high on the closest side, resulting a larger size of the focus lens unit LF.

An inequality (7) represents a distortion ratio at the wide-angle end. The ideal image height y0 is a value obtained by f×tan θ where the focal distance of the entire system at the wide-angle end is f, and the angle (half-angle of view) corresponding to the maximum real image height y, formed by the optical axis and a light ray which is incident on the lens of the entire system positioned closest to the object side from the object is θ. The real image height y may be specified based on the maximum radius of the image circle of the zoom lens L0. If a value is greater than the upper limit value, that entails weakening the refractive power of the first lens unit L1 to reduce the absolute value of a distortion ratio. Thus, that will make the distance from the lens surface positioned closest to the object side to the image plane IP longer, which is likely to result in a larger size of the zoom lens L0. If a value is less than the lower limit value, the absolute value of a distortion ratio becomes too large, making it difficult to provide images with sufficiently high image quality due to a significantly compressed peripheral portion of the image.

An inequality (8) represents the ratio of the focal distance of the focus lens unit LF to the focal distance of the entire system at the wide-angle end. If a value is less than the lower limit value, the absolute value of the focal distance of the focus lens unit LF becomes too large, increasing the amount of movement in focusing. As a result, the focus lens unit LF can be arranged at a position where the height of an off-axis ray is high, resulting in a larger size of the focus lens unit LF. If a value is greater than the upper limit value, the absolute value of the focal distance of the focus lens unit LF becomes too small, making the variations in spherical aberration, field curvature, and astigmatism too large in focusing.

An inequality (9) represents the ratio of the combined focal distance of the individual lenses from the aperture stop SP to the focus lens unit LF to the focal distance of the entire system at the wide-angle end. If a value is less than the lower limit value, the combined focal distance of the lens units from the aperture stop SP to the focus lens unit LF becomes too short, making the spherical aberration too large. If a value is greater than the upper limit value, the combined focal distance of the lens units from the aperture stop SP to the focus lens unit LF becomes too long, so that the height of an off-axis ray incident on the focus lens unit LF is high, resulting in a larger size of the focus lens unit LF.

An inequality (10) represents the ratio of the distance between the aperture stop SP and the surface vertex of the lens surface of the focus lens unit LF positioned closest to the object at the telephoto end to the distance between the aperture stop SP and the surface vertex of the lens surface of the focus lens unit LF positioned closest to the object at the wide-angle end. If a value is less than the lower limit value, the distance between the aperture stop SP and the surface vertex of the focus lens unit LF on the object side at the wide-angle end becomes too long, so that the height of an off-axis ray incident on the focus lens unit LF at the wide-angle end becomes high, resulting in a larger size of the focus lens unit LF. If a value is greater than the upper limit value, the distance between the aperture stop SP and the surface vertex of the lens surface of the focus lens unit LF on the object side at the telephoto end becomes too long, so that the height of an off-axis ray incident on the focus lens unit LF at the telephoto end becomes high, resulting in a larger size of the focus lens unit LF.

An inequality (11) represents a zoom ratio. If a value is greater than the upper limit value, the amounts of movement of the individual lens units are likely to be increased, resulting in a larger size of the zoom lens L0 due to the space for that movement. If a value is less than the lower limit value, a zoom ratio becomes too small, making it difficult to provide a sufficient function of the zoom lens L0.

In addition, it is more suitable that at least either the upper limit values or the lower limit values of the inequalities (3) to (11) each are set to the corresponding following numerical range.

$$-3.3 < (1-\beta f^2)\times\beta r^2 < -1.4 \tag{3a}$$

$$0.7 < skw/fw < 1.3 \tag{4a}$$

$$30 < vdn < 42 \tag{5a}$$

$$0.030 < Dt/ft < 0.11 \tag{6a}$$

$$-19 < 100\times(y-y0)/y0 < -10 \tag{7a}$$

$$-3.1 < fna/fw < -1.1 \tag{8a}$$

$$1.6 < fs/fw < 2.7 \tag{9a}$$

$$0.9 < Lft/Lfw < 1.3 \tag{10a}$$

$$1.3 < ft/fw < 2.0 \tag{11a}$$

Further, it is more suitable that at least either the upper limit values or the lower limit values of the inequalities (3) to (11) each are set to the corresponding following numerical range.

$$-3.2 < (1-\beta f^2)\times\beta r^2 < -1.5 \quad (3b)$$

$$0.8 < skw/fw < 1.2 \quad (4b)$$

$$34 < vdn < 40 \quad (5b)$$

$$0.035 < Dt/ft < 0.10 \quad (6b)$$

$$-18 < 100\times(y-y0)/y0 < -14 \quad (7b)$$

$$-2.8 < fna/fw < -1.2 \quad (8b)$$

$$1.7 < fs/fw < 2.4 \quad (9b)$$

$$1.0 < Lft/Lfw < 1.2 \quad (10b)$$

$$1.4 < ft/fw < 1.9 \quad (11b)$$

Next, the configurations of the zoom lenses L0 according to the embodiments 1 to 6 will be described in detail.

The zoom lens L0 of the embodiment 1 consists of a first lens unit L1 having negative refractive power, a second lens unit L2 having positive refractive power, a third lens unit L3 having negative refractive power, a fourth lens unit L4 having positive refractive power, and a fifth lens unit L5 having positive refractive power, all of which are arranged in that order from the object side to the image side. The alternate arrangement of a lens unit having negative power and a lens unit having positive refractive power allows appropriate correction of magnification chromatic aberration and axial chromatic aberration. Further, a lens unit having positive refractive power arranged as the fifth lens unit L5 provides a back focal distance as well as a wide angle of view, reducing the occurrence of a ghost caused by unwanted light reflected by the image plane IP (or a low-pass filter or an IR cut filter arranged on the object side thereof) and the fifth lens unit L5. Further, the third lens unit L3 is moved in focusing, and the lens surface of the third lens unit L3 on the object side is formed in a concave shape concentric with the aperture stop SP. This configuration reduces the variation in field curvature and astigmatism even when the third lens unit L3 is moved in focusing, providing a higher performance thereof over the image. Furthermore, the third lens unit L3 consisting of two lenses, i.e., a positive lens and a negative lens, allows reduction of variation in magnification chromatic aberration and axial chromatic aberration even when the third lens unit L3 is moved in the optical axis direction.

Further, the first lens unit L1 is simply moved toward the image from the wide-angle end to the telephoto end as a locus in zooming. This configuration provides a larger absolute value of the focal distance of the first lens unit L1 (i.e., a weakened refraction power thereof), which leads to a higher performance of the zoom lens L0.

In the embodiment 2, as a difference from the embodiment 1, the third lens unit L3 serving as a focus lens unit consists of a single negative lens. This configuration allows a miniaturization of the third lens unit L3, which is moved in focusing.

The zoom lens L0 of the embodiment 3 consists of a first lens unit L1 having negative refractive power, a second lens unit L2 having positive refractive power, a third lens unit L3 having negative refractive power, a fourth lens unit L4 having negative refractive power, and a fifth lens unit L5 having positive refractive power, all of which are arranged in that order from the object side to the image side. A lens group having negative refractive power arranged as the fourth lens unit L4 provides an effective correction of magnification chromatic aberration occurring in the fifth lens unit L5 having positive refractive power. Further, a positive lens arranged at a position closest to the object reduces negative distortion occurring in the first lens unit L1, resulting a smaller distortion ratio. This reduces the ratio of compression of the periphery of the image surface, providing an enhanced resolving power thereof.

Further, by joining the fourth lens unit L4 and the fifth lens unit L5, the intensity of unwanted light reflected by the fourth lens unit L4 and the fifth lens unit L5 is weakened, reducing the occurrence of a ghost.

Further, the movement of the fifth lens unit L5 toward the object from the wide-angle to the telephoto end allows the arrangement of the fifth lens unit L5 at a position where the height of an off-axis ray is low at the telephoto end, providing a smaller diameter thereof.

The zoom lens L0 of the embodiment 4 consists of a first lens unit L1 having negative refractive power, a second lens unit L2 having positive refractive power, a third lens unit L3 having positive refractive power, a fourth lens unit L4 having negative refractive power, a fifth lens unit L5 having positive refractive power, and a sixth lens unit L6 having positive refractive power. The lenses having positive refractive power arranged before and after the aperture stop SP are divided into two lens groups, and each of the lens groups is independently moved in zooming. This configuration allows effective correction of the spherical aberration and the comatic aberration in a wide zooming range.

The zoom lens L0 of the embodiment 5 consists of a first lens unit L1 having negative refractive power, a second lens unit L2 having positive refractive power, a third lens unit L3 having negative refractive power, a fourth lens unit L4 having positive refractive power, and a fifth lens unit L5 having negative refractive power, all of which are arranged in that order from the object side to the image side. The arrangement of a lens unit having positive refractive power and a lens unit having negative refractive power as the fourth lens unit L4 and the fifth lens unit L5, respectively, enables movement of the position of a combined front principal point of the fourth lens unit L4 and the fifth lens unit L5 toward the object, providing a shorter back focal distance, which leads to a miniaturization of the zoom lens L0.

The zoom lens L0 of the embodiment 6 consists of a first lens unit L1 having negative refractive power, a second lens unit L2 having positive refractive power, a third lens unit L3 having negative refractive power, and a fourth lens unit L4 having positive refractive power, all of which are arranged in that order from the object side to the image side. The fourth lens unit L4 consisting of one positive lens and one negative lens provides an effective correction of the magnification chromatic aberration in a wide zooming range.

The above-described zoom lenses L0 according to the embodiments 1 to 6 may be used for an image capturing apparatus having an image processing function that corrects aberration (i.e., distortion and magnification chromatic aberration).

Numerical examples 1 to 6 respectively corresponding to the embodiments 1 to 6 will be described below.

In the surface data about each of the numerical examples 1 to 6, r represents a curvature radius of an optical surface, and d (mm) represents an on-axis interval (i.e., on-optical axis distance) between the m-th surface and the (m+1)-th surface. In this regard, m is a surface number counting from the light incident side. Further, nd is a refractive index of each optical member with respect to the d-line, and vd is an Abbe number of the optical member. Further, an Abbe number vd of one material is expressed by the following formula where refractive indexes with respect to Fraunhofer lines, i.e., a d-line (wavelength: 587.6 nm), an F-line (wavelength: 486.1 nm), a C-line (wavelength: 656.3 nm), and a g-line (wavelength: 435.8 nm), are Nd, NF, NC, and Ng, respectively.

$$vd=(Nd-1)/(NF-NC)$$

Further, a symbol * is added to the right side of a surface number when the optical surface is an aspheric surface. An aspheric surface is expressed by the following formula where the amount of displacement from a surface vertex in the optical axis direction is X, the height from the optical axis in a direction perpendicular to the optical axis is h, a paraxial curvature radius is R, a conic constant is K, and aspheric coefficients of respective orders are A4, A6, A8, A10, A12, . . .

$$x=(h^2/R)/[1+(1-(1+k)(h/R)^2)^{1/2}]+A4\times h^4+A6\times h^6+A8\times h^8+A10\times h^{10}$$

Further, e±XX described in each of the aspheric coefficients represents $\times 10^{\pm XX}$

Numerical Example 1

Unit: Mm
Surface Data

| Surface No. | r | d | nd | νd | Effective Diameter |
|---|---|---|---|---|---|
| 1 | 45.932 | 1.80 | 2.00100 | 29.1 | 36.70 |
| 2 | 19.277 | 7.27 | | | 29.17 |
| 3 | 81.393 | 1.40 | 1.84943 | 42.6 | 27.28 |
| 4 | 20.862 | 6.78 | | | 24.31 |
| 5 | −32.534 | 1.30 | 1.49700 | 81.5 | 24.21 |
| 6 | 39.245 | 0.34 | | | 25.06 |
| 7 | 36.818 | 6.92 | 1.78582 | 36.7 | 25.39 |
| 8 | −45.455 | (Variable) | | | 25.35 |
| 9 | 46.667 | 1.80 | 1.60738 | 56.8 | 11.23 |
| 10 | ∞ | 3.00 | | | 10.63 |
| 11 (Aperture) | ∞ | 3.00 | | | 10.34 |
| 12 | 88.981 | 1.00 | 1.80400 | 46.5 | 10.34 |
| 13 | 19.604 | 2.53 | 1.71300 | 53.9 | 10.25 |
| 14 | −123.595 | 2.00 | | | 10.21 |
| 15 | 16.661 | 2.78 | 1.51633 | 64.1 | 10.41 |
| 16 | 47.619 | 4.87 | | | 10.69 |
| 17 | 34.510 | 1.00 | 1.90043 | 37.4 | 12.26 |
| 18 | 11.580 | 5.34 | 1.49700 | 81.5 | 12.24 |
| 19 | −36.852 | (Variable) | | | 13.26 |
| 20 | −26.584 | 3.17 | 1.77250 | 49.6 | 14.02 |
| 21 | −13.000 | 1.10 | 1.85107 | 36.9 | 14.79 |
| 22 | −225.385 | (Variable) | | | 16.29 |
| 23* | −50.000 | 3.00 | 1.53110 | 55.9 | 21.52 |
| 24* | −34.796 | (Variable) | | | 23.70 |
| 25 | −157.498 | 4.50 | 1.79008 | 48.6 | 36.60 |
| 26 | −45.000 | 13.50 | | | 37.47 |
| Image Plane | ∞ | | | | |

Aspheric Surface Data
The 23rd Surface $K=0.00000e+000$ $A4=-7.50939e-005$ $A6=6.59902e-007$ $A8=-4.44635e-009$ $A10=1.37303e-011$ The 24th Surface $K=0.00000e+000$ $A4=-3.09530e-005$ $A6=4.44991e-007$ $A8=-1.75524e-009$ $A10=4.51720e-012$ Various Kinds of Data
Zoom Ratio 1.89

| | Wide-Angle End | Intermediate | Telephoto End |
|---|---|---|---|
| Focal Distance | 15.45 | 20.34 | 29.15 |
| F-Number | 4.60 | 5.25 | 6.32 |
| Half-Angle of View (°) | 49.36 | 44.61 | 36.19 |
| Image Height | 18.00 | 20.06 | 21.33 |
| Total Length of Lens | 115.26 | 109.84 | 107.01 |
| BF | 13.50 | 13.50 | 13.50 |
| d8 | 25.18 | 13.47 | 1.21 |
| d19 | 2.67 | 3.30 | 5.13 |
| d22 | 7.82 | 7.19 | 5.36 |
| d24 | 1.20 | 7.49 | 16.92 |
| Position of Entrance Pupil | 17.00 | 15.69 | 13.74 |
| Position of Exit | −64.71 | −86.93 | −130.67 |
| Pupil | 29.40 | | |
| Position of Front | | 31.91 | 37.00 |
| Principal Point | −1.95 | | |
| Position of Rear Principal Point | | −6.84 | −15.65 |

Zoom Lens Unit Data

| Unit | Beginning Surface | Focal Distance | Length of Lens Configuration | Position of Front Principal Point | Position of Rear Principal Point |
|---|---|---|---|---|---|
| 1 | 1 | −25.31 | 25.82 | −0.46 | −26.81 |
| 2 | 9 | 24.31 | 27.31 | 9.72 | −14.84 |
| 3 | 20 | −31.88 | 4.27 | 0.06 | −2.33 |
| 4 | 23 | 201.66 | 3.00 | 6.03 | 4.20 |
| 5 | 25 | 78.36 | 4.50 | 3.46 | 0.99 |

Single Lens Data

| Lens | Beginning Surface | Focal Distance |
|---|---|---|
| 1 | 1 | −34.34 |
| 2 | 3 | −33.38 |
| 3 | 5 | −35.58 |
| 4 | 7 | 26.88 |
| 5 | 9 | 76.83 |
| 6 | 12 | −31.48 |
| 7 | 13 | 23.91 |
| 8 | 15 | 48.16 |
| 9 | 17 | −19.76 |
| 10 | 18 | 18.40 |
| 11 | 20 | 29.90 |
| 12 | 21 | −16.25 |
| 13 | 23 | 201.66 |
| 14 | 25 | 78.36 |

Numerical Example 2

Unit: Mm
Surface Data

| Surface No. | r | d | nd | νd | Effective Diameter |
|---|---|---|---|---|---|
| 1 | 39.485 | 1.80 | 2.00100 | 29.1 | 35.98 |
| 2 | 19.277 | 6.35 | | | 29.06 |
| 3 | 81.393 | 1.40 | 1.90043 | 37.4 | 27.89 |
| 4 | 21.695 | 6.53 | | | 24.75 |
| 5 | 37.674 | 1.30 | 1.49700 | 81.5 | 24.58 |
| 6 | 45.445 | 1.55 | | | 24.80 |
| 7 | 48.066 | 6.33 | 1.80610 | 33.3 | 25.36 |
| 8 | −58.121 | (Variable) | | | 25.19 |
| 9 | −75.709 | 2.91 | 1.63930 | 44.9 | 12.62 |
| 10 | 99.071 | 5.00 | | | 11.75 |
| 11 (Aperture) | ∞ | 3.00 | | | 10.25 |
| 12 | 90.807 | 1.00 | 1.80400 | 46.5 | 10.20 |
| 13 | 21.203 | 2.41 | 1.71300 | 53.9 | 10.11 |
| 14 | −125.965 | 2.00 | | | 10.05 |
| 15 | 14.434 | 3.39 | 1.48749 | 70.2 | 10.46 |
| 16 | 47.619 | 3.38 | | | 10.70 |
| 17 | 40.616 | 1.00 | 1.90043 | 37.4 | 11.54 |
| 18 | 10.473 | 5.52 | 1.49700 | 81.5 | 11.52 |
| 19 | −36.785 | (Variable) | | | 12.72 |
| 20 | −24.105 | 1.10 | 1.80100 | 35.0 | 14.79 |
| 21 | −332.736 | (Variable) | | | 15.94 |
| 22* | −50.000 | 3.00 | 1.53110 | 55.9 | 21.21 |
| 23* | −33.834 | (Variable) | | | 23.27 |
| 24 | −186.603 | 4.91 | 1.80400 | 46.5 | 37.46 |
| 25 | −45.000 | 13.50 | | | 38.41 |
| Image Plane | ∞ | | | | |

Aspheric Surface Data
The 22nd Surface $K$=0.00000$e$+000

$A4$=−3.17244$e$−005

$A6$=2.39294$e$−007

$A8$=−2.65521$e$−009

$A10$=1.39956$e$−011

The 23rd Surface $K$=0.00000$e$+000

$A4$=7.78280$e$−006

$A6$=1.77889$e$−007

$A8$=−9.23774$e$−010

$A10$=4.78158$e$−012

Various Kinds of Data
Zoom Ratio 1.89

| | Wide-Angle End | Intermediate | Telephoto End |
|---|---|---|---|
| Focal Distance | 15.45 | 20.53 | 29.15 |
| F-Number | 4.60 | 5.27 | 6.36 |
| Half-Angle of View (°) | 49.88 | 45.31 | 36.58 |
| Image Height | 18.34 | 20.75 | 21.63 |
| Total Length of Lens | 115.28 | 109.06 | 106.60 |
| BF | 13.50 | 13.50 | 13.50 |
| d8 | 24.84 | 12.64 | 1.20 |

-continued

| | Wide-Angle End | Intermediate | Telephoto End |
|---|---|---|---|
| d19 | 2.86 | 4.14 | 6.51 |
| d21 | 9.00 | 7.72 | 5.35 |
| d23 | 1.20 | 7.19 | 16.16 |
| Position of Entrance Pupil | 17.59 | 16.29 | 14.57 |
| Position of Exit Pupil | −64.63 | −84.63 | −125.12 |
| Position of Front Principal Point | 29.98 | 32.52 | 37.59 |
| Position of Rear Principal Point | −1.95 | −7.03 | −15.65 |

Zoom Lens Unit Data

| Unit | Beginning Surface | Focal Distance | Length of Lens Configuration | Position of Front Principal Point | Position of Rear Principal Point |
|---|---|---|---|---|---|
| 1 | 1 | −24.39 | 25.25 | 0.53 | −24.54 |
| 2 | 9 | 24.70 | 29.61 | 10.23 | −15.77 |
| 3 | 20 | −32.50 | 1.10 | −0.05 | −0.66 |
| 4 | 22 | 185.12 | 3.00 | 5.69 | 3.85 |
| 5 | 24 | 72.63 | 4.91 | 3.53 | 0.85 |

Single Lens Data

| Lens | Beginning Surface | Focal Distance |
|---|---|---|
| 1 | 1 | −39.38 |
| 2 | 3 | −33.22 |
| 3 | 5 | −41.23 |
| 4 | 7 | 33.53 |
| 5 | 9 | 67.57 |
| 6 | 12 | −34.63 |
| 7 | 13 | 25.63 |
| 8 | 15 | 41.11 |
| 9 | 17 | −15.92 |
| 10 | 18 | 17.06 |
| 11 | 20 | −32.50 |
| 12 | 22 | 185.12 |
| 13 | 24 | 72.63 |

Numerical Example 3

Unit: Mm
Surface Data

| Surface No. | r | d | nd | νd | Effective Diameter |
|---|---|---|---|---|---|
| 1 | 52.248 | 2.62 | 1.51633 | 64.1 | 28.75 |
| 2 | 140.000 | 0.15 | | | 26.67 |
| 3 | 26.292 | 0.80 | 1.90043 | 37.4 | 20.18 |
| 4 | 10.697 | 3.20 | | | 15.85 |
| 5 | 60.521 | 0.80 | 1.95375 | 32.3 | 15.54 |
| 6 | 10.056 | 3.71 | | | 13.19 |
| 7 | −25.717 | 0.80 | 1.49700 | 81.5 | 13.14 |
| 8 | −14.607 | 4.06 | 1.90366 | 31.3 | 13.41 |
| 9 | −55.225 | (Variable) | | | 13.10 |
| 10 | −101.139 | 2.20 | 1.48749 | 70.2 | 7.88 |
| 11 | −21.879 | 2.89 | | | 8.23 |
| 12 (Aperture) | ∞ | 1.75 | | | 8.52 |
| 13 | 13.538 | 5.13 | 1.48749 | 70.2 | 8.74 |
| 14 | −10.601 | 1.00 | 1.77250 | 49.6 | 8.16 |
| 15 | −22.350 | 3.58 | | | 8.16 |

-continued

| Surface No. | r | d | nd | vd | Effective Diameter |
|---|---|---|---|---|---|
| 16 | 20.040 | 0.70 | 1.90043 | 37.4 | 9.69 |
| 17 | 8.853 | 4.71 | 1.49700 | 81.5 | 9.63 |
| 18 | −21.100 | (Variable) | | | 10.46 |
| 19 | −19.295 | 0.70 | 1.91082 | 35.3 | 10.75 |
| 20 | −100.891 | (Variable) | | | 11.26 |
| 21* | −24.999 | 1.50 | 1.53110 | 55.9 | 14.14 |
| 22* | −26.775 | (Variable) | | | 15.39 |
| 23 | −182.094 | 4.42 | 1.60311 | 60.6 | 18.76 |
| 24 | −22.000 | (Variable) | | | 20.18 |
| Image Plane | ∞ | | | | |

Aspheric Surface Data
The 21st Surface $K$=0.00000$e$+000

$A4$=−1.91538$e$−004

$A6$=5.07567$e$−006

$A8$=−8.17417$e$−008

$A10$=5.32571$e$−010

The 22nd Surface $K$=0.00000$e$+000

$A4$=−6.30674$e$−005

$A6$=4.22634$e$−006

$A8$=−5.18522$e$−008

$A10$=2.90202$e$−010

Various Kinds of Data
Zoom Ratio 1.47

| | Wide-Angle End | Intermediate | Telephoto End |
|---|---|---|---|
| Focal Distance | 9.97 | 12.66 | 14.64 |
| F-Number | 3.50 | 3.94 | 4.23 |
| Half-Angle of View (°) | 49.63 | 44.83 | 41.54 |
| Image Height | 11.72 | 12.58 | 12.97 |
| Total Length of Lens | 72.73 | 71.60 | 71.78 |
| BF | 10.06 | 12.25 | 14.31 |
| d9 | 10.09 | 4.76 | 1.89 |
| d18 | 1.44 | 2.18 | 2.76 |
| d20 | 5.42 | 4.68 | 4.11 |
| d22 | 0.99 | 3.00 | 4.00 |
| d24 | 10.06 | 12.25 | 14.31 |
| Position of Entrance Pupil | 11.15 | 10.50 | 10.06 |
| Position of Exit Pupil | −51.09 | −59.37 | −63.10 |
| Position of Front Principal Point | 19.49 | 20.92 | 21.93 |
| Position of Rear Principal Point | 0.09 | −0.40 | −0.33 |

Zoom Lens Unit Data

| Unit | Beginning Surface | Focal Distance | Length of Lens Configuration | Position of Front Principal Point | Position of Rear Principal Point |
|---|---|---|---|---|---|
| 1 | 1 | −12.21 | 16.14 | 2.87 | −11.14 |
| 2 | 10 | 15.46 | 21.97 | 9.98 | −10.48 |
| 3 | 19 | −26.30 | 0.70 | −0.09 | −0.45 |
| 4 | 21 | −1004.27 | 1.50 | −19.52 | −20.90 |
| 5 | 23 | 41.06 | 4.42 | 3.10 | 0.37 |

Single Lens Data

| Lens | Beginning Surface | Focal Distance |
|---|---|---|
| 1 | 1 | 159.82 |
| 2 | 3 | −20.53 |
| 3 | 5 | −12.74 |
| 4 | 7 | −18.62 |
| 5 | 8 | 13.15 |
| 6 | 10 | 56.75 |
| 7 | 13 | 13.11 |
| 8 | 14 | −27.11 |
| 9 | 16 | −18.15 |
| 10 | 17 | 13.24 |
| 11 | 19 | −26.30 |
| 12 | 21 | −1004.27 |
| 13 | 23 | 41.06 |

Numerical Example 4

Unit: Mm
Surface Data

| Surface No. | r | d | nd | vd | Effective Diameter |
|---|---|---|---|---|---|
| 1 | 40.925 | 1.80 | 2.05090 | 26.9 | 33.27 |
| 2 | 21.334 | 4.87 | | | 27.89 |
| 3 | 79.995 | 1.40 | 1.95375 | 32.3 | 26.78 |
| 4 | 24.034 | 4.47 | | | 23.95 |
| 5 | −91.221 | 1.30 | 1.49700 | 81.5 | 23.68 |
| 6 | 31.289 | 2.00 | | | 22.62 |
| 7 | 59.784 | 3.91 | 1.82097 | 22.5 | 22.63 |
| 8 | −85.008 | (Variable) | | | 22.27 |
| 9 | 100.000 | 1.00 | 1.63980 | 34.5 | 9.42 |
| 10 | 20.000 | 2.47 | 1.88645 | 38.8 | 9.51 |
| 11 | −90.366 | 3.00 | | | 9.49 |
| 12 (Aperture) | ∞ | (Variable) | | | 9.12 |
| 13 | 15.735 | 3.66 | 1.52647 | 69.8 | 11.78 |
| 14 | −17.484 | 0.59 | | | 11.90 |
| 15 | −16.171 | 1.00 | 1.90043 | 37.4 | 11.76 |
| 16 | 44.055 | 5.10 | 1.49700 | 81.5 | 12.35 |
| 17 | −13.352 | (Variable) | | | 13.43 |
| 18 | −14.286 | 1.10 | 1.87587 | 39.9 | 13.46 |
| 19 | −74.875 | (Variable) | | | 14.64 |
| 20 | 5903.921 | 2.85 | 1.49700 | 81.5 | 19.07 |
| 21* | −33.757 | (Variable) | | | 20.14 |
| 22 | −98.558 | 3.58 | 1.80400 | 46.5 | 26.77 |
| 23 | −45.000 | (Variable) | | | 28.10 |
| Image Plane | ∞ | | | | |

Aspheric Surface Data
The 21st Surface $K$=0.00000$e$+000

$A4$=6.79219$e$-005

$A6$=1.06797$e$-007

$A8=1.34694e\text{-}009$ $A10=-5.68552e\text{-}012$

Various Kinds of Data
Zoom Ratio 1.82

| | Wide-Angle End | Intermediate | Telephoto End |
|---|---|---|---|
| Focal Distance | 16.00 | 20.22 | 29.17 |
| F-Number | 4.60 | 4.97 | 5.66 |
| Half-Angle of View (°) | 48.58 | 45.05 | 36.57 |
| Image Height | 18.14 | 20.26 | 21.64 |
| Total Length of Lens | 99.94 | 95.51 | 91.54 |
| BF | 13.04 | 19.20 | 30.42 |
| d8 | 22.55 | 12.93 | 1.20 |
| d12 | 4.71 | 4.81 | 4.91 |
| d17 | 2.26 | 2.44 | 3.69 |
| d19 | 5.43 | 4.78 | 3.15 |
| d21 | 7.84 | 7.24 | 4.07 |
| d23 | 13.04 | 19.20 | 30.42 |
| Position of Entrance Pupil | 17.09 | 15.78 | 13.40 |
| Position of Exit Pupil | −53.81 | −50.02 | −38.59 |
| Position of Front Principal Point | 29.26 | 30.09 | 30.24 |
| Position of Rear Principal Point | −2.96 | −1.02 | 1.25 |

Zoom Lens Unit Data

| Unit | Beginning Surface | Focal Distance | Length of Lens Configuration | Position of Front Principal Point | Position of Rear Principal Point |
|---|---|---|---|---|---|
| 1 | 1 | −22.38 | 19.75 | 2.35 | −15.16 |
| 2 | 9 | 35.44 | 6.47 | 0.93 | −4.01 |
| 3 | 13 | 27.72 | 10.35 | 4.14 | −3.77 |
| 4 | 18 | −20.33 | 1.10 | −0.14 | −0.73 |
| 5 | 20 | 67.55 | 2.85 | 1.89 | −0.01 |
| 6 | 22 | 100.02 | 3.58 | 3.55 | 1.62 |

Single Lens Data

| Lens | Beginning Surface | Focal Distance |
|---|---|---|
| 1 | 1 | −44.50 |
| 2 | 3 | −36.47 |
| 3 | 5 | −46.71 |
| 4 | 7 | 43.28 |
| 5 | 9 | −39.27 |
| 6 | 10 | 18.67 |
| 7 | 13 | 16.35 |
| 8 | 15 | −13.03 |
| 9 | 16 | 21.24 |
| 10 | 18 | −20.33 |
| 11 | 20 | 67.55 |
| 12 | 22 | 100.02 |

Numerical Example 5

Unit: Mm
Surface Data

| Surface No. | r | d | nd | vd | Effective Diameter |
|---|---|---|---|---|---|
| 1 | 50.254 | 1.80 | 2.05090 | 26.9 | 36.85 |
| 2 | 19.398 | 6.82 | | | 29.33 |
| 3 | 135.195 | 1.40 | 1.95375 | 32.3 | 28.56 |
| 4 | 30.089 | 5.41 | | | 26.58 |
| 5 | −47.967 | 1.30 | 1.49700 | 81.5 | 26.52 |
| 6 | 37.077 | 0.19 | | | 27.13 |
| 7 | 35.891 | 7.61 | 1.82283 | 30.8 | 27.32 |
| 8 | −62.958 | (Variable) | | | 27.08 |
| 9 | 100.000 | 1.00 | 1.53458 | 47.9 | 10.67 |
| 10 | 20.000 | 2.47 | 1.84733 | 42.8 | 10.74 |
| 11 | −7293.532 | 3.20 | | | 10.64 |
| 12 (Aperture) | ∞ | 6.70 | | | 10.31 |
| 13 | 20.310 | 3.45 | 1.56657 | 68.8 | 11.12 |
| 14 | −23.439 | 0.77 | | | 11.40 |
| 15 | −17.148 | 1.00 | 1.90043 | 37.4 | 11.36 |
| 16 | 58.384 | 4.41 | 1.49700 | 81.5 | 12.04 |
| 17 | −15.093 | (Variable) | | | 13.17 |
| 18 | −22.042 | 1.10 | 1.85000 | 35.0 | 14.06 |
| 19 | −73.968 | (Variable) | | | 14.82 |
| 20* | 123.352 | 4.61 | 1.51380 | 54.6 | 21.29 |
| 21* | −32.035 | (Variable) | | | 22.35 |
| 22 | −43.536 | 1.50 | 1.88449 | 39.0 | 23.28 |
| 23 | −87.118 | (Variable) | | | 24.42 |
| Image Plane | ∞ | | | | |

Aspheric Surface Data
The 20th Surface $K=0.00000e+000$ $A4=7.78121e-006$ $A6=-1.41841e-007$ $A8=1.32693e-009$ $A10=-7.58503e-012$ The 21st Surface $K=0.00000e+000$ $A4=4.93770e-005$ $A6=-4.36212e-008$ $A8=1.50692e-009$ $A10=-6.87281e-012$ Various Kinds of Data
Zoom Ratio 1.88

| | Wide-Angle End | Intermediate | Telephoto End |
|---|---|---|---|
| Focal Distance | 15.53 | 20.47 | 29.15 |
| F-Number | 4.60 | 5.01 | 5.59 |
| Half-Angle of View (°) | 49.20 | 43.44 | 35.66 |
| Image Height | 18.00 | 19.38 | 20.92 |
| Total Length of Lens | 120.00 | 109.11 | 99.49 |
| BF | 15.70 | 23.59 | 24.20 |
| d8 | 32.68 | 17.17 | 1.20 |
| d17 | 4.32 | 4.50 | 5.63 |
| d19 | 10.14 | 6.17 | 3.93 |
| d21 | 2.40 | 2.92 | 9.77 |
| d23 | 15.70 | 23.59 | 24.20 |
| Position of Entrance Pupil | 17.77 | 16.10 | 13.44 |

-continued

| | Wide-Angle End | Intermediate | Telephoto End |
|---|---|---|---|
| Position of Exit Pupil | −40.00 | −33.43 | −33.85 |
| Position of Front Principal Point | 28.97 | 29.22 | 27.95 |
| Position of Rear Principal Point | 0.16 | 3.13 | −4.95 |

Zoom Lens Unit Data

| Unit | Beginning Surface | Focal Distance | Length of Lens Configuration | Position of Front Principal Point | Position of Rear Principal Point |
|---|---|---|---|---|---|
| 1 | 1 | −26.49 | 24.53 | −0.82 | −23.99 |
| 2 | 9 | 25.34 | 23.00 | 10.82 | −11.53 |
| 3 | 18 | −37.30 | 1.10 | −0.25 | −0.86 |
| 4 | 20 | 50.00 | 4.61 | 2.44 | −0.63 |
| 5 | 22 | −100.01 | 1.50 | −0.81 | −1.62 |

Single Lens Data

| Lens | Beginning Surface | Focal Distance |
|---|---|---|
| 1 | 1 | −30.99 |
| 2 | 3 | −40.84 |
| 3 | 5 | −41.86 |
| 4 | 7 | 28.78 |
| 5 | 9 | −46.97 |
| 6 | 10 | 23.54 |
| 7 | 13 | 19.77 |
| 8 | 15 | −14.63 |
| 9 | 16 | 24.62 |
| 10 | 18 | −37.30 |
| 11 | 20 | 50.00 |
| 12 | 22 | −100.01 |

Numerical Example 6

Unit: Mm
Surface Data

| Surface No. | r | d | nd | vd | Effective Diameter |
|---|---|---|---|---|---|
| 1 | 46.382 | 1.80 | 2.05090 | 26.9 | 36.85 |
| 2 | 19.375 | 6.91 | | | 29.33 |
| 3 | 148.313 | 1.40 | 1.95375 | 32.3 | 28.56 |
| 4 | 28.489 | 5.81 | | | 26.58 |
| 5 | −43.395 | 1.30 | 1.49700 | 81.5 | 26.52 |
| 6 | 35.729 | 0.20 | | | 27.13 |
| 7 | 35.165 | 8.11 | 1.79522 | 32.0 | 27.32 |
| 8 | −51.640 | (Variable) | | | 27.08 |
| 9 | 100.000 | 1.00 | 1.51753 | 52.4 | 10.67 |
| 10 | 20.000 | 2.47 | 1.82588 | 45.0 | 10.74 |
| 11 | −7234.968 | 3.06 | | | 10.64 |
| 12 (Aperture) | ∞ | 7.94 | | | 10.31 |
| 13 | 20.503 | 3.02 | 1.56724 | 64.1 | 11.12 |
| 14 | −21.985 | 0.74 | | | 11.40 |
| 15 | −16.908 | 1.00 | 1.90043 | 37.4 | 11.36 |
| 16 | 58.603 | 4.42 | 1.49700 | 81.5 | 12.04 |
| 17 | −15.011 | (Variable) | | | 13.17 |
| 18 | −23.876 | 1.10 | 1.85000 | 35.0 | 14.06 |
| 19 | −82.849 | (Variable) | | | 14.82 |
| 20* | 112.899 | 3.87 | 1.49967 | 65.6 | 21.29 |
| 21* | −32.833 | 2.02 | | | 22.35 |
| 22 | −40.113 | 1.50 | 1.75377 | 52.3 | 23.28 |
| 23 | −87.118 | (Variable) | | | 24.42 |
| Image Plane | ∞ | | | | |

Aspheric Surface Data
The 20th Surface $K$=0.00000$e$+000

$A4$=8.69555$e$−006

$A6$=−1.43147$e$−007

$A8$=1.23812$e$−009

$A10$=−8.16964$e$−012

The 21st Surface $K$=0.00000$e$+000

$A4$=4.80363$e$−005

$A6$=−4.52567$e$−008

$A8$=1.32395$e$−009

$A10$=−7.40260$e$−012

Various Kinds of Data
Zoom Ratio 1.87

| | Wide-Angle End | Intermediate | Telephoto End |
|---|---|---|---|
| Focal Distance | 15.60 | 19.00 | 29.15 |
| F-Number | 4.54 | 4.86 | 5.73 |
| Half-Angle of View (°) | 49.09 | 44.98 | 35.72 |
| Image Height | 18.00 | 18.99 | 20.96 |
| Total Length of Lens | 120.00 | 112.82 | 104.38 |
| BF | 18.33 | 24.39 | 34.47 |
| d8 | 30.79 | 19.62 | 1.20 |
| d17 | 2.82 | 2.53 | 3.93 |
| d19 | 10.38 | 8.60 | 7.10 |
| d23 | 18.33 | 24.39 | 34.47 |
| Position of Entrance Pupil | 17.79 | 16.60 | 13.71 |
| Position of Exit Pupil | −40.00 | −36.67 | −35.07 |
| Position of Front Principal Point | 29.21 | 29.69 | 30.64 |
| Position of Rear Principal Point | 2.73 | 5.39 | 5.32 |

Zoom Lens Unit Data

| Unit | Beginning Surface | Focal Distance | Length of Lens Configuration | Position of Front Principal Point | Position of Rear Principal Point |
|---|---|---|---|---|---|
| 1 | 1 | −27.61 | 25.54 | −1.42 | −26.70 |
| 2 | 9 | 25.57 | 23.66 | 12.00 | −11.67 |
| 3 | 18 | −39.80 | 1.10 | −0.24 | −0.84 |
| 4 | 20 | 101.68 | 7.39 | 0.11 | −5.31 |

Single Lens Data

| Lens | Beginning Surface | Focal Distance |
|---|---|---|
| 1 | 1 | −32.78 |
| 2 | 3 | −37.19 |
| 3 | 5 | −39.21 |
| 4 | 7 | 27.44 |
| 5 | 9 | −48.51 |
| 6 | 10 | 24.15 |
| 7 | 13 | 19.20 |
| 8 | 15 | −14.48 |
| 9 | 16 | 24.53 |
| 10 | 18 | −39.80 |
| 11 | 20 | 51.36 |
| 12 | 22 | −100.00 |

Various numerical values according to the embodiments 1 to 6 are illustrated in the following table 1.

TABLE 1

| | Inequalities | Embodiment1 | Embodiment2 | Embodiment3 | Embodiment4 | Embodiment5 | Embodiment6 |
|---|---|---|---|---|---|---|---|
| (1) | 0.3 < Lfw/Ls < 0.5 | 0.42 | 0.43 | 0.44 | 0.34 | 0.37 | 0.35 |
| (2) | 0.8 < (Rb + Ra)/(Rb − Ra) < 2.2 | 1.27 | 1.16 | 1.47 | 1.47 | 1.85 | 1.81 |
| (3) | −3.5 < (1 − β f^2) * β r^2 < −1.3 | −1.88 | −1.75 | −1.55 | −3.10 | −1.92 | −1.91 |
| (4) | 0.6 < skw/fw < 1.4 | 0.87 | 0.87 | 1.01 | 0.81 | 1.01 | 1.17 |
| (5) | 28 < ν d < 45 | 36.90 | 34.97 | 35.25 | 39.88 | 35.00 | 35.00 |
| (6) | 0.02 < Dt/ft < 0.12 | 0.06 | 0.06 | 0.09 | 0.04 | 0.07 | 0.06 |
| (7) | −20% < ditw < −8% | −17.22 | −15.24 | −14.18 | −16.16 | −16.81 | −17.46 |
| (8) | −3.5 < fna/fw < −1.0 | −2.06 | −2.10 | −2.64 | −1.27 | −2.40 | −2.55 |
| (9) | 1.4 < fs/fw < 3.0 | 1.94 | 2.06 | 1.78 | 1.73 | 2.39 | 2.31 |
| (10) | 0.8 < Lft/Lfw < 1.4 | 1.10 | 1.15 | 1.06 | 1.09 | 1.06 | 1.06 |
| (11) | 1.2 < ft/fw < 2.1 | 1.89 | 1.89 | 1.47 | 1.82 | 1.88 | 1.87 |

<Image Capturing Apparatus>

Figure 13:
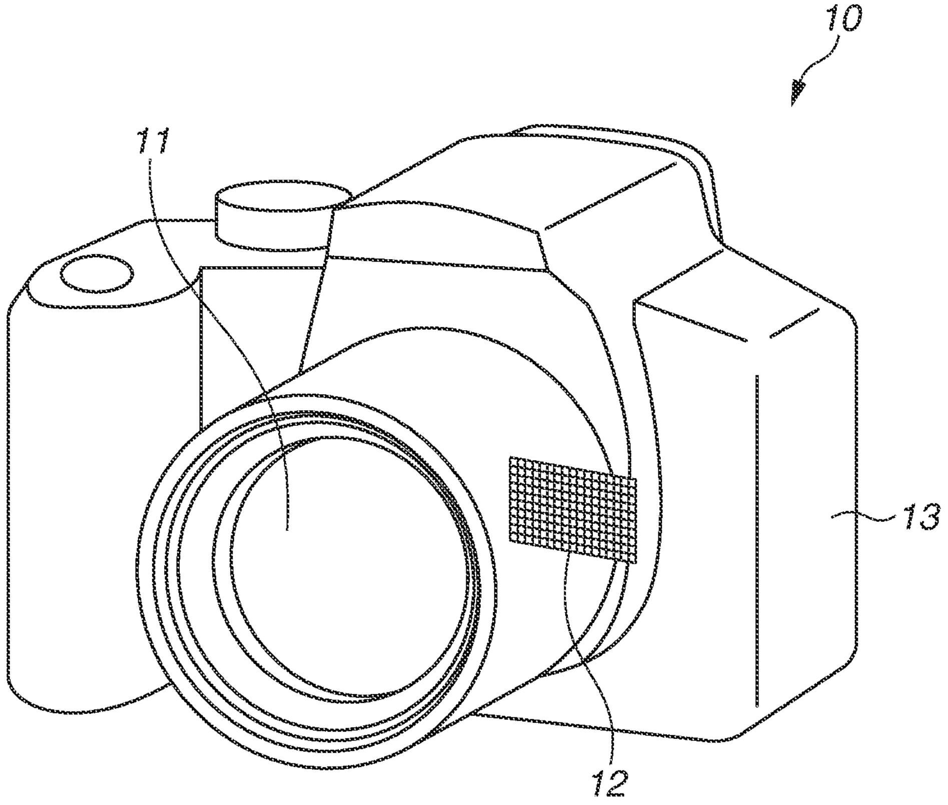
FIG. 13 is a schematic diagram illustrating an image capturing apparatus.

Next, an exemplary embodiment of a digital still camera (image capturing apparatus) using the zoom lens L0 according to the present disclosure will be described with reference to FIG. 13. In FIG. 13, a camera main body 10 has a lens apparatus 11 that includes any one of the zoom lenses L0 described in the embodiments 1 to 6.

A solid-state image sensor (photoelectric conversion element) 12 is built into the camera main body 10. The solid-state image sensor 12 is a CCD sensor or a CMOS sensor that receives and photoelectrically converts an optical image formed by the lens apparatus 11. The camera main body 10 may be a so-called single-lens reflex camera including a quick-turn mirror, or may be a so-called mirrorless camera without including a quick-turn mirror.

As described above, the zoom lens L0 according to each of the embodiments of the present disclosure applied to the image capturing apparatus such as a digital still camera provides quick focusing and high-quality images with less variations in image quality at focusing positions.

Although the exemplary embodiment and the examples according to the present disclosure have been described as the above, the present disclosure is not limited to these exemplary embodiment and examples. Various combinations, variations and modifications can be made within the scope of the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-181187, filed Nov. 5, 2021, which is hereby incorporated by reference herein in its entirety.

What is claimed is:

1. A zoom lens including a first lens unit having negative refractive power, a second lens unit having positive refractive power, and a rear lens group including one lens unit or more lens units, all of which are sequentially arranged from an object side to an image side in the zoom lens, the first lens unit is moved for zooming, and an interval between each of adjacent lens units is changed for zooming, the zoom lens comprising:

an aperture stop, wherein the rear lens group includes a focus lens unit having negative refractive power that is moved to the image side in focusing from an infinite to a close distance and at least one lens unit arranged on an image side of the focus lens unit, wherein the first lens unit is positioned closest to the object side among lens units arranged in the zoom lens, wherein the first lens unit consists of a negative meniscus lens with a convex surface oriented toward the object side, a negative meniscus lens with a convex surface oriented toward the object side, a biconcave lens, and a biconvex lens that are sequentially arranged from the object side to the image side, wherein the focus lens unit consists of a cemented lens or a single lens, wherein a total number of the lens units arranged in the zoom lens is five, and the rear lens group consists of a lens unit having negative refractive power, a lens unit having positive refractive power, and a lens unit having positive refractive power that are sequentially arranged from the object side to the image side, and wherein, where a distance from the aperture stop to a surface vertex of the focus lens unit positioned closest to the object side at a wide-angle end is Lfw, a distance from the aperture stop to an image plane at the wide-angle end is Ls, a curvature radius of a lens surface of the focus lens unit positioned closest to the object side is Ra, and a curvature radius of a lens surface of the focus lens unit positioned closest to the image side is Rb, inequalities $$0.3<Lfw/Ls<0.5$$

$$0.8<(Rb+Ra)/(Rb-Ra)<2.2$$

are satisfied.

2. The zoom lens according to claim 1, wherein the focus lens unit consists of a single lens.

3. The zoom lens according to claim 1, wherein, where a lateral magnification of the focus lens unit at a telephoto end is βf and a combined lateral magnification of all of lens units arranged on the image side from the focus lens unit at the telephoto end is βr, an inequality $$-3.5<(1-\beta f^2)\times\beta r^2<-1.3$$

is satisfied.

4. The zoom lens according to claim 1, wherein, where a back focal distance at the wide-angle end is skw and a focal distance of the zoom lens at the wide-angle end is fw, an inequality $$0.6<skw/fw<1.4$$

is satisfied.

5. The zoom lens according to claim 1, wherein, where an Abbe number of a negative lens included in the focus lens unit is νdn, an inequality $$28<\nu dn<45$$

is satisfied.

6. The zoom lens according to claim 1, wherein, where an amount of movement of the focus lens unit in focusing from the infinite to the closest distance at the telephoto end is Dt, and a focal distance of the zoom lens at the telephoto end is ft, an inequality $$0.020<Dt/ft<0.12$$

is satisfied.

7. The zoom lens according to claim 1, wherein, where a focal distance of the focus lens unit is fna, and a focal distance of the zoom lens at the wide-angle end is fw, an inequality $$-3.5<fna/fw<-1.0$$

is satisfied.

8. The zoom lens according to claim 1, wherein, where a combined focal distance of all of lenses from the aperture stop to the focus lens unit at the wide-angle end is fs, and a focal distance of the zoom lens at the wide-angle end is fw, an inequality $$1.4<fs/fw<3.0$$

is satisfied.

9. The zoom lens according to claim 1, wherein, where a distance from the aperture stop to a surface vertex of the lens surface of the focus lens unit positioned closest to the object side at the telephoto end is Lft, an inequality $$0.8<Lft/Lfw<1.4$$

is satisfied.

10. The zoom lens according to claim 1, wherein, where a focal distance of the zoom lens at the telephoto end is ft, and a focal distance of the zoom lens at the wide-angle end is fw, an inequality $$1.2<ft/fw<2.1$$

is satisfied.

11. The zoom lens according to claim 1, wherein the focus lens unit is moved to the object side in zooming from the wide-angle end to the telephoto end.

12. The zoom lens according to claim 1, wherein a lens unit having positive refractive power is arranged at a position closest to the image side in the rear lens group.

13. The zoom lens according to claim 1, wherein a refractive index of the negative lens included in the focus lens unit is greater than or equal to 1.75.

14. An image pickup apparatus comprising:
- the zoom lens according to claim 1; and
- a sensor configured to receive an image formed by the zoom lens.

15. The image pickup apparatus according to claim 14, wherein the focus lens unit consists of a single lens.

16. The image pickup apparatus according to claim 14, wherein, where a lateral magnification of the focus lens unit at a telephoto end is βf and a combined lateral magnification of all of lens units arranged on the image side from the focus lens unit at the telephoto end is βr, an inequality $$-3.5<(1-\beta f^2)\times\beta r^2<-1.3$$

is satisfied.

17. The image pickup apparatus according to claim 14, wherein, where a back focal distance at the wide-angle end is skw and a focal distance of the zoom lens at the wide-angle end is fw, an inequality $$0.6<skw/fw<1.4$$

is satisfied.

18. The image pickup apparatus according to claim 14, wherein, where an Abbe number of a negative lens included in the focus lens unit is νdn, an inequality $$28<\nu dn<45$$

is satisfied.

19. The image pickup apparatus according to claim 14, wherein, where an amount of movement of the focus lens unit in focusing from the infinite to the closest distance at the telephoto end is Dt, and a focal distance of the zoom lens at the telephoto end is ft, an inequality $$0.020<Dt/ft<0.12$$

is satisfied.

20. The zoom lens according to claim 1, wherein a lens positioned closest to the image side is a positive meniscus lens whose convex surface is oriented toward the image side.

21. A zoom lens including a first lens unit having negative refractive power, a second lens unit having positive refractive power, and a rear lens group including one lens unit or more lens units, all of which are sequentially arranged from an object side to an image side in the zoom lens, the first lens unit is moved for zooming, and an interval between each of adjacent lens units is changed for zooming, the zoom lens comprising:
- an aperture stop,
- wherein the rear lens group includes a focus lens unit having negative refractive power that is moved to the image side in focusing from an infinite to a close distance and at least one lens unit arranged on an image side of the focus lens unit,
- wherein the first lens unit is positioned closest to the object side among lens units arranged in the zoom lens,
- wherein the first lens unit consists of a negative meniscus lens with a convex surface oriented toward the object side, a negative meniscus lens with a convex surface oriented toward the object side, a biconcave lens, and a biconvex lens that are sequentially arranged from the object side to the image side,
- wherein the focus lens unit consists of a cemented lens or a single lens,
- wherein a lens unit positioned closest to the image side among the lens units arranged in the zoom lens consists of a single positive meniscus lens with a convex surface oriented toward the image side, and wherein, where a distance from the aperture stop to a surface vertex of the focus lens unit positioned closest to the object side at a wide-angle end is Lfw, a distance from the aperture stop to an image plane at the wide-angle end is Ls, a curvature radius of a lens surface of the focus lens unit positioned closest to the object side is Ra, and a curvature radius of a lens surface of the focus lens unit positioned closest to the image side is Rb, inequalities $$0.3<Lfw/Ls<0.5$$

$$0.8<(Rb+Ra)/(Rb-Ra)<2.2$$

are satisfied.

22. The zoom lens according to claim 21, wherein a lens unit positioned adjacent to the lens unit positioned closest to the image side consists of a single positive lens.

23. The zoom lens according to claim 21, wherein the lens unit positioned closest to the image side is immobilized in zooming.

* * * * *